US011246111B2

(12) United States Patent
Park et al.

(10) Patent No.: US 11,246,111 B2
(45) Date of Patent: Feb. 8, 2022

(54) METHOD AND DEVICE FOR OPERATING TERMINAL IN 5G SYSTEM

(71) Applicant: SAMSUNG ELECTRONICS CO., LTD., Suwon-si (KR)

(72) Inventors: Suyoung Park, Suwon-si (KR); Suha Yoon, Suwon-si (KR); Euichang Jung, Suwon-si (KR); Hongju Park, Suwon-si (KR); Soomin Lee, Suwon-si (KR); Sunghyuk Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/041,765

(22) PCT Filed: Mar. 28, 2019

(86) PCT No.: PCT/KR2019/003675
§ 371 (c)(1),
(2) Date: Sep. 25, 2020

(87) PCT Pub. No.: WO2019/190247
PCT Pub. Date: Oct. 3, 2019

(65) Prior Publication Data
US 2021/0051616 A1    Feb. 18, 2021

(30) Foreign Application Priority Data
Mar. 29, 2018   (KR) .................. 10-2018-0036777

(51) Int. Cl.
*H04W 56/00* (2009.01)
*H04W 48/16* (2009.01)
(Continued)

(52) U.S. Cl.
CPC ......... *H04W 56/001* (2013.01); *H04W 48/16* (2013.01); *G16Y 10/75* (2020.01);
(Continued)

(58) Field of Classification Search
CPC ............... H04W 56/001; H04W 48/16; H04W 74/0833; H04W 84/042; H04W 88/02;
(Continued)

(56) References Cited

U.S. PATENT DOCUMENTS

2016/0374035 A1   12/2016  Wang et al.
2017/0325256 A1   11/2017  Islam et al.
(Continued)

FOREIGN PATENT DOCUMENTS

CN        106376076        2/2017
KR    10-2015-0072359        6/2015
(Continued)

OTHER PUBLICATIONS

International Search Report for PCT/KR2019/003675 dated Jul. 4, 2019, 5 pages.
(Continued)

*Primary Examiner* — Diane D Mizrahi
(74) *Attorney, Agent, or Firm* — Nixon & Vanderhye, P.C.

(57) ABSTRACT

The present disclosure relates to a communication technique for converging a 5G communication system for supporting a higher data transfer rate beyond a 4G system with an IoT technology, and a system therefor. The present disclosure may be applied to intelligent services (for example, smart home, smart buildings, smart cities, smart cars or connected cars, health care, digital educations, retail business, security and safety-related services, etc.) on the basis of a 5G communication technology and an IoT-related technology. The communication method for a terminal according to one embodiment of the present invention may comprise the steps of: detecting at least one synchronization signal; determining whether the at least one detected synchronization signal belongs to an operating frequency band for a terminal; and
(Continued)

storing information relating to the at least one synchronization signal which has been determined as belonging to the operating frequency band for the terminal.

14 Claims, 23 Drawing Sheets

(51) Int. Cl.
*G16Y 10/75* (2020.01)
*H04W 74/08* (2009.01)
*H04W 84/04* (2009.01)
*H04W 88/02* (2009.01)

(52) U.S. Cl.
CPC ...... *H04W 74/0833* (2013.01); *H04W 84/042* (2013.01); *H04W 88/02* (2013.01)

(58) Field of Classification Search
CPC .. G16Y 10/75; H04J 11/0069; H04J 2211/005
See application file for complete search history.

(56) References Cited

U.S. PATENT DOCUMENTS

| | | | |
|---|---|---|---|
| 2019/0174406 A1 | 6/2019 | Hwang et al. | |
| 2019/0357239 A1 | 11/2019 | Moon et al. | |
| 2021/0014808 A1* | 1/2021 | Takahashi | H04W 56/00 |

FOREIGN PATENT DOCUMENTS

| | | |
|---|---|---|
| KR | 10-2016-0012951 | 2/2016 |
| KR | 10-2018-0005131 | 1/2018 |
| KR | 10-2018-0018448 | 2/2018 |
| KR | 10-2018-0019581 | 2/2018 |

OTHER PUBLICATIONS

Written Opinion of the ISA for PCT/KR2019/003675 dated Jul. 4, 2019, 4 pages.
Extended Search Report dated Mar. 2, 2021 for EP 19774538.3.
English-language translation of CN106376076.

\* cited by examiner

FIG. 6B

METHOD AND DEVICE FOR OPERATING TERMINAL IN 5G SYSTEM

This application is the U.S. national phase of International Application No. PCT/KR2019/003675 filed Mar. 28, 2019 which designated the U.S. and claims priority to KR Patent Application No. 10-2018-0036777 filed Mar. 29, 2018, the entire contents of each of which are hereby incorporated by reference.

TECHNICAL FIELD

The disclosure relates to a method and an apparatus for operating terminal in a 5G system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

A fifth-generation (5G) communication system considers supporting various services, compared to an existing fourth-generation (4G) communication system. For example, representative services include enhanced mobile broadband (eMBB), ultra-reliable and low-latency communication (URLLC), massive machine-type communication (mMTC), and evolved multimedia broadcast/multicast service (eM-BMS). A system providing URLLC is referred to as a URLLC system, and a system providing eMBB is referred to as an eMBB system. The terms "service" and "system" may be interchangeably used.

URLLC is a service newly considered in the 5G communication system, rather than in the existing 4G communication system, and is required to meet the requirements of ultra-high reliability (e.g., a packet error rate of about 10-5) and low latency (e.g., about 0.5 msec), compared to other services. In order to satisfy these strict requirements, the URLLC service needs to apply a transmission time interval (TTI) shorter than that of the eMBB service, and various operating methods using a TTI are being considered.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology

DISCLOSURE OF INVENTION

Technical Problem

An aspect of the disclosure is to provide a method and a device for a terminal to reduce time required to initially access a 5G system.

Further, an aspect of the disclosure is to provide a method in which a terminal uses, for cell measurement and rate matching, frequency/time location information about a synchronization signal (e.g., a synchronization signal (SS)/physical broadcast channel (PBCH) block) included in a band operated by a base station.

The technical subjects pursued in the disclosure may not be limited to the above mentioned technical subjects, and other technical subjects which are not mentioned may be clearly understood, through the following descriptions, by those skilled in the art to which the disclosure pertains.

Technical Solution

To achieve the foregoing aspects, a communication method of a terminal may include: detecting at least one synchronization signal; identifying whether the at least one detected synchronization signal is included in an operating frequency band of the terminal; and storing information about the at least one synchronization signal identified to be included in the operating frequency band of the terminal.

The information about the at least one synchronization signal may include at least one of frequency information and time information about the at least one synchronization signal.

The method may further include: detecting a cell, based on a first synchronization signal among the at least one detected synchronization signal; and camping on the detected cell.

The storing of the information about the at least one synchronization signal may include storing a first synchronization signal associated with a cell on which the terminal camps and a second synchronization signal included in the operating frequency band of the terminal.

The detecting of the at least one synchronization signal may include: determining whether there is previously stored information about a synchronization signal; and detecting the at least one synchronization signal, based on the previously stored information about the synchronization signal when there is the previously stored information about the synchronization signal.

The detecting of the at least one synchronization signal may include: receiving information about at least one synchronization signal included in an operating frequency band of a base station from the base station; storing the information about the at least one synchronization signal included in the operating frequency band of the base station; and detecting the at least one synchronization signal included in the operating frequency band of the terminal, based on the information about the at least one synchronization signal included in the operating frequency band of the base station.

The at least one detected synchronization signal may include at least one of a synchronization signal of a cell on which the terminal camps, a synchronization signal included in a radio resource control (RRC) message for measurement, and a synchronization signal detected in an initial access procedure of the terminal. To achieve the foregoing aspects, a terminal may include: a transceiver configured to transmit and receive a signal; and a controller configured to detect at least one synchronization signal, to identify whether the at least one detected synchronization signal is included in an operating frequency band of the terminal, and to store information about the at least one synchronization signal identified to be included in the operating frequency band of the terminal.

Advantageous Effects of Invention

According to an embodiment of the disclosure, there may be provided a method and a device for a terminal to reduce time required to initially access a 5G system.

Further, according to the disclosure, a terminal may use, for cell measurement and rate matching, frequency/time location information about a synchronization signal (SS/PBCH block) included in a band operated by a base station.

Effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIGS. 6A, 6B, 6C, and 6D illustrate an example of an SS/PBCH block according to an embodiment of the disclosure;

MODE FOR THE INVENTION

Figure 1:
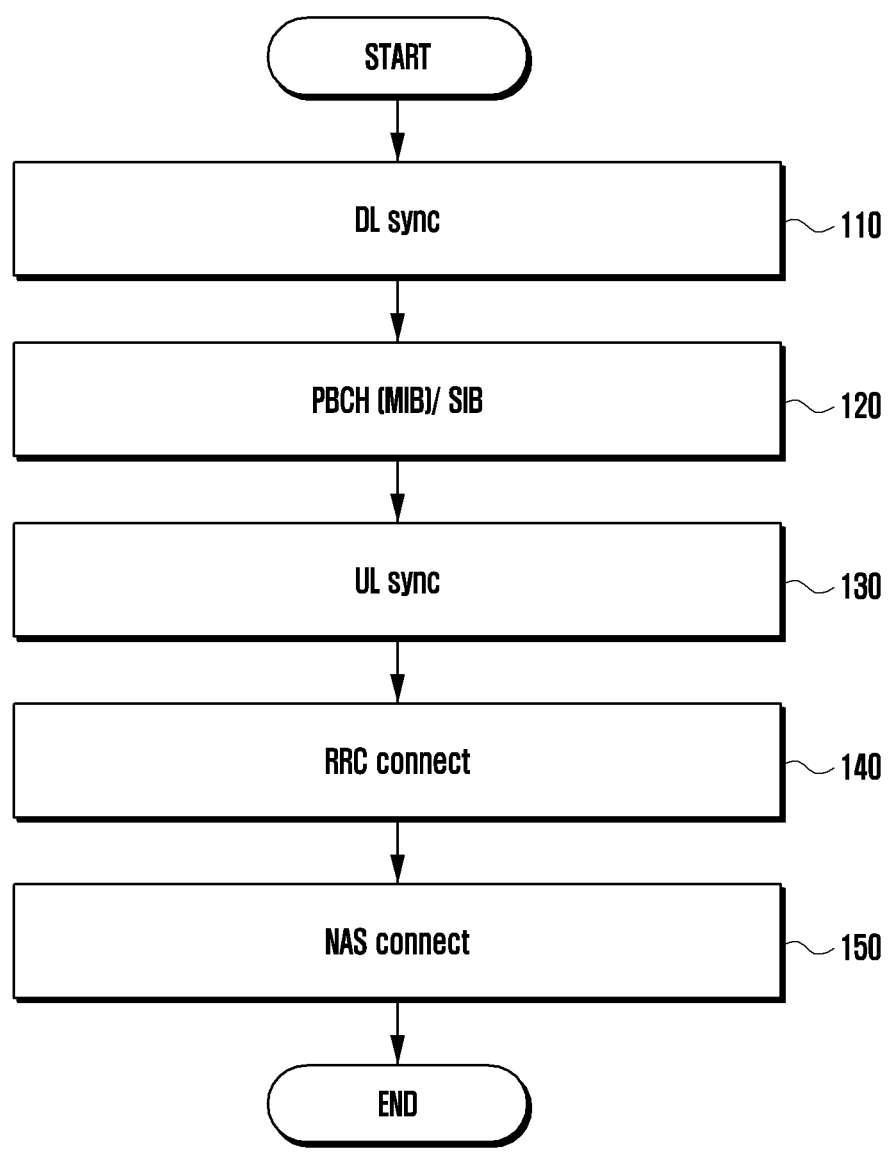
FIG. 1 illustrates an example of an initial access procedure of a terminal.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Specific terms used in the following description are provided to assist in understanding the disclosure, and the use of such specific terms may be modified in different forms without departing from the scope of the technical idea of the disclosure.

Both a 4G (LTE) system and a 5G system are based on orthogonal frequency-division multiplexing (OFDM). A subcarrier spacing (SCS) is fixed at 15 kHz in LTE, while a plurality of subcarrier spacings (e.g., 7.5 kHz, 15 kHz, 30 kHz, 60 kHz, 120 kHz, and the like) may be supported in the 5G system in order to provide various services (e.g., eMBB, URLLC, mMTC, and the like) and to provide wireless communication in various frequency ranges (e.g. sub-6 GHz, above-6 GHz, and the like). Further, in 5G system, a plurality of SCSs may be allowed to be subjected to time division multiplexing (TDM) or frequency division multiplexing (FDM) even in one carrier. In addition, the maximum bandwidth of one component carrier (CC) is assumed to be 20 MHz in LTE, while the maximum bandwidth of one CC may be considered to be up to 1 GHz in the 5G system.

Therefore, in the 5G system, radio resources having different SCSs may be subjected to FDM or TDM. A subframe may be assumed as a basic unit of scheduling in LTE, while a slot having 14 symbols may be assumed as a basic unit of scheduling in the 5G system. That is, the absolute time of a subframe is always set to 1 ms in LTE, while the length of a slot may vary depending on a SCS in the 5G system.

Particularly, for a synchronous signal (SS) used in an initial access procedure, the 3GPP define an SS/physical broadcast channel (PBCH) block. An SS/PBCH block may include at least a primary synchronous signal (PSS), a secondary synchronous signal (SSS), and a PBCH. When an SS/PBCH block is transmitted, a PSS, an SSS, and a PBCH may be transmitted in a sequence. The SCS of an SS/PBCH block may be transmitted as one of 15 kHz, 30 kHz, 120 kHz, and 240 kHz depending on a frequency band. Specifically, an SCS having 15 kHz or 30 kHz may be transmitted in a frequency band of 6 GHz or less, and an SCS having 120 kHz or 240 kHz may be transmitted in a frequency band of 6 GHz or higher. Further, by dividing the above frequency bands more specifically, an SS/PBCH block having one SCS for each frequency band may be transmitted.

In addition, a plurality of SS/PBCH blocks may be transmitted in one operating band, which is for enabling terminals with various capabilities to coexist and operate within a system bandwidth. Here, a system bandwidth may be increased, but the location of an SS/PBCH block received by a terminal may vary depending on a network configuration. Further, the transmission time of the SS/PBCH block may vary depending on the network configuration. In addition, the transmission interval of the SS/PBCH block may not be constant.

A terminal (UE: user equipment) may perform cell level measurement using an SS/PBCH block. That is, when the terminal attempts a handover between cells or camping on a cell, the terminal may select a cell, based on a measured value using the reference signal received power (RSRP) of the SS/PBCH block.

FIG. 1 illustrates an example of an initial access procedure of a terminal.

Referring to FIG. 1, the initial access procedure in LTE may include operation 110 to operation 150. In operation 110, the terminal (UE) may achieve downlink (DL) synchronization using a PSS and an SSS. In operation 120, the UE may obtain basic information about a base station using information transmitted through a PBCH master information block (MIB). The UE may collect pieces of information for cell access through system information (e.g., a system information block (SIB)).

The UE may achieve uplink (UL) synchronization and may establish a radio-layer channel in operation 130 while performing a random access channel (RACH) process, based on the information obtained through the SIB. In this process, the UE may perform radio resource control (RRC) connection in operation 140 and may transmit and receive a message for establishing non-access stratum (NAS) connection in operation 150, thereby establishing a radio channel FIG. 2 illustrates an example of a downlink radio resource.

Figure 2:
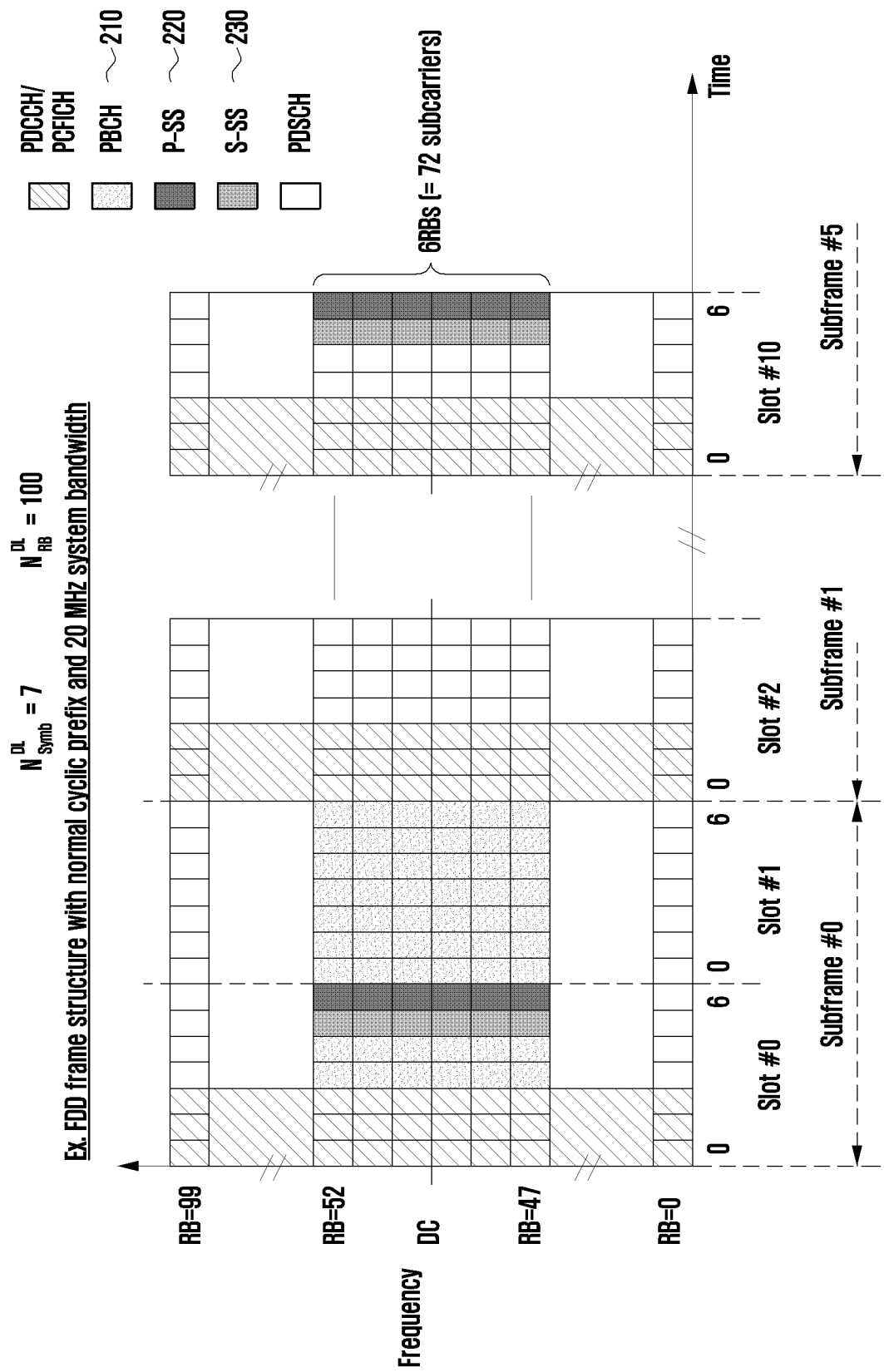
FIG. 2 illustrates an example of a downlink radio resource.

Referring to FIG. 2, a signal used for a UE to achieve downlink (DL) synchronization in an LTE system is a PSS 220/SSS 230. In the LTE system, one cell is defined by one operating bandwidth. In this case, the PSS 220/SSS 230 may be positioned at the center of the operating bandwidth of the cell. The bandwidth of the PSS 220/SSS 230 is 1.4 MHz and is defined as a minimum operating bandwidth for the LTE system. The PSS 220/SSS 230 may be transmitted every 5 ms, which is different from a period for a PBCH 210 transmitting basic information about the LTE system.

In a case of the PSS 220, a Zadoff-Chu sequence having a length of 62 may be transmitted through six resource blocks (RBs) (1.4 MHz band). The UE may achieve DL frame synchronization and may obtain some information of cell identification information (e.g., a physical cell ID) through the PSS 220.

In a case of the SSS 230, 62 scrambling sequences based on an m-sequence may be transmitted through six RBs (1.4 MHz band). The UE may obtain the remaining information of the cell identification information (e.g., physical cell ID) through the SSS 230.

In LTE, the PBCH 210 may be periodically transmitted every 10 ms, and data may be changed every 40 ms. The PBCH 210 may include information about the operating bandwidth of a corresponding base station, information about a physical hybrid automatic repeat request (ARQ) indicator channel (PHICH), and subframe number (SFN) information.

In the LTE system, the UE may store information about the last base station on which the UE camps when powered off (e.g., cell information, absolute radio-frequency channel number (ARFCN) information, or the like) and may then terminate, which may reduce time required for frequency search when the UE reboots.

Figure 3:
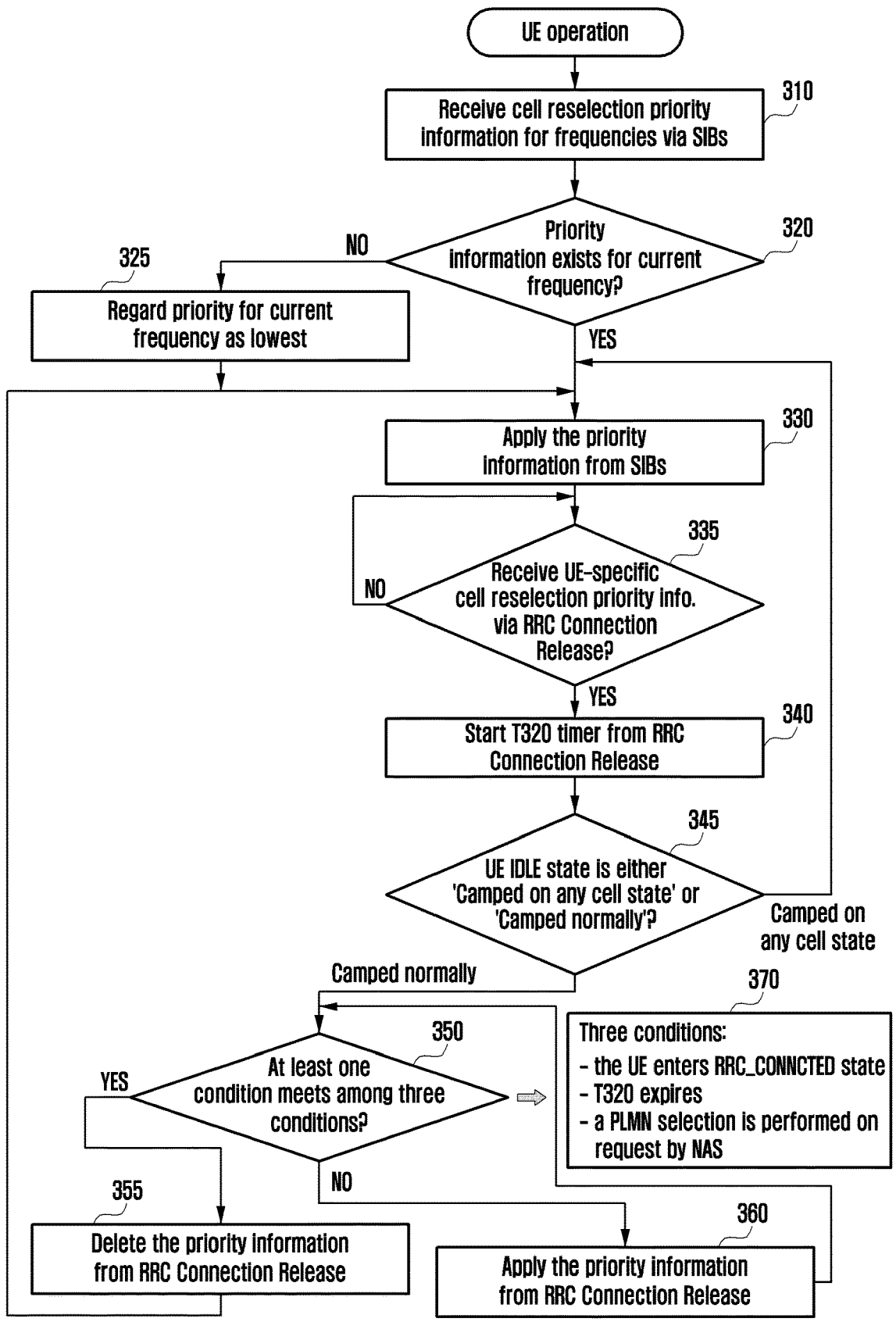
FIG. 3 illustrates an example of a cell reselection procedure of a terminal.

FIG. 3 illustrates an example of a cell reselection procedure of a UE.

Referring to FIG. 3, per-frequency priority information for cell reselection may be broadcast through system information (e.g., an SIB) or may be transmitted to a particular UE through an RRC connection release message, which is dedicated RRC signaling, and may be applied in a cell reselection process.

Cell reselection is a process of reselecting a serving cell so that a mobile UE can be connected to a cell having the best channel state. A network prioritizes frequencies to control cell reselection of UEs in a standby mode. For example, when one UE receives priority information about two frequencies f1 and f2 and f1 has a higher priority than f2, the UE is highly likely to stay at f1. Further, when the UE stays at f2 but f2 has a poor channel state, the UE attempts to change to f1. Priority information about a frequency may be broadcast through an SIB or may be provided to a particular UE through an RRC connection release message, which is dedicated RRC signaling. Even though a UE already has priority information about frequencies through an SIB, when the UE is provided with UE-specific priority information through RRC signaling, the priority information through the SIB may be ignored. Priority information about each frequency may be transmitted to a UE through a cell reselection priority information element (cellReselectionPriority IE), and each frequency may be assigned one of eight levels of priorities in total. Frequencies between radio access technologies (RATs) may not be assigned the same priority. When an idle state of a UE is a 'camped on any cell state', the UE may apply frequency priority information received through an SIB and may not use but only store priority information received through RRC signaling. A cellReselectionPriority IE is an optional IE and may not exist. In this case, priority information about a corresponding frequency is not assigned. Here, a UE may consider the priority of the frequency as the lowest level.

In operation 310, the UE may be provided with priority information about frequencies used not only in EUTRA but also in other RATs through an SIB. However, priority information about all frequencies is not necessarily provided. For example, priority information about a frequency of a serving cell on which the UE currently camps may not be provided.

In operation 320, the UE may identify the priority information about the frequencies received in operation 310. When the priority information about the frequency of the current serving cell is not provided to the UE, the UE may consider the priority of the frequency of the serving cell as the lowest level in operation 325. The UE may apply the priority information about the frequencies in operation 330.

When receiving an RRC connection release message from a base station, the UE may switch from a connected mode to an idle mode. The RRC message may include frequency priority information. This information is UE-specific information and is generally applied in preference to frequency priority information provided through an SIB. Therefore, the UE may identify whether frequency priority information is included in the RRC message in operation 335. When frequency priority information is included, the UE may operate one timer by applying a T320 value also included in the RRC message in operation 340.

The UE may determine in operation 345 whether a current idle mode state is the 'camped on any cell state' or a 'camped normally state'. The 'camped normally state' refers to a state in which a UE is camping on a suitable cell. The suitable cell may refer to a cell that is capable of providing a normal service for the UE and satisfies the following specific conditions:

A cell corresponds to a selected public land mobile network (PLMN), a registered PLMN, or one PLMN in an equivalent PLMN list;

A cell is not barred;

A cell satisfies a cell selection criterion;

For a closed subscriber group (CSG) cell, the CSG ID of the cell is present in a whitelist of the UE;

For a cell designated to enable a particular service, the ID of the service is present in the whitelist of the UE.

The 'camped on any cell state' refers to a state in which a UE cannot camp on a suitable cell and is thus camping on an acceptable cell. In the acceptable cell, a normal service is not possible, and a UE can attempt only an emergency call. The acceptable cell may be a cell satisfying the following conditions:

A cell is not barred;

A cell satisfies a cell selection criterion.

When the UE is in an idle state of the 'camped on any cell state', the UE may return to operation 330 to apply the priority information about the frequencies provided through the SIB instead of the priority information provided through the RRC connection release message. When the UE is in an idle state of the 'camped normally state', the UE may determine whether at least one of the following three conditions 370 is satisfied in operation 350.

The three conditions (370) are:

The UE is switched to the connected mode;

A T320 timer expired;

A PLMN selection process is performed according to an NAS request.

When any one of the above conditions is satisfied, the UE discards the priority information provided through the RRC connection release message in operation 355 and returns to operation 330 to apply the priority information about the frequencies provided through the SIB. When any condition is not satisfied, the UE may apply the priority information provided through the RRC connection release message in operation 360.

Figure 4:
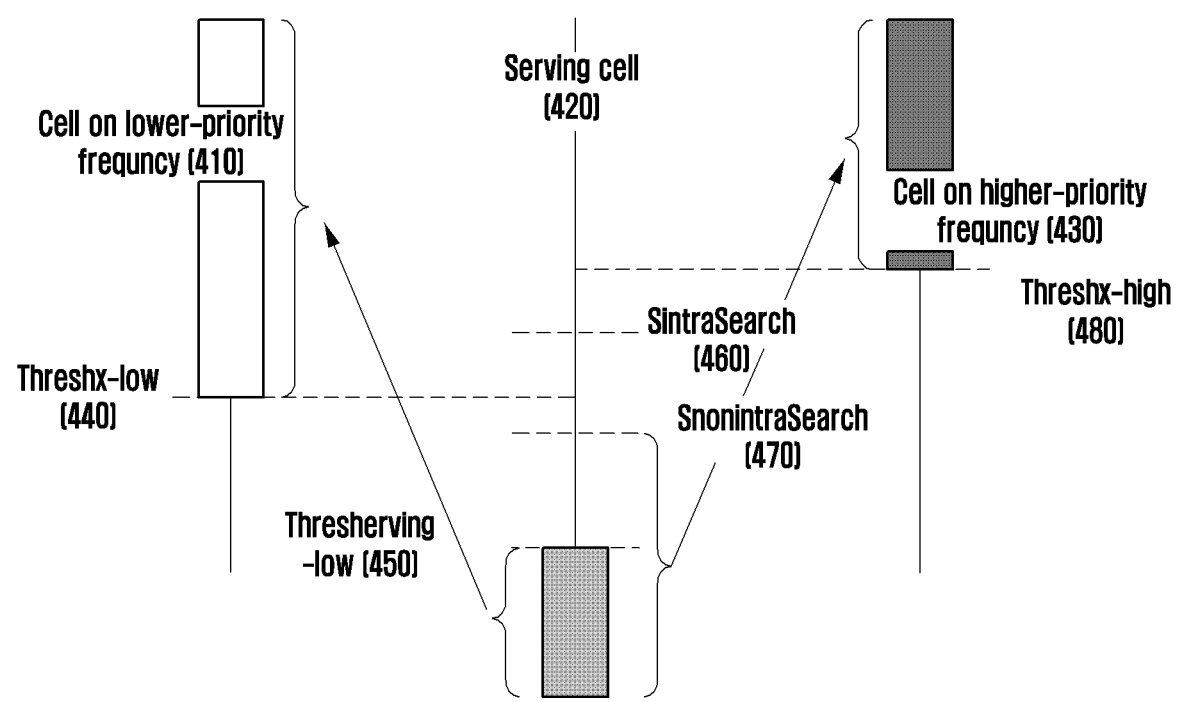
FIG. 4 illustrates an example of a method in which a terminal performs measurement on a frequency.

FIG. 4 illustrates an example of a method in which a UE performs measurement on a frequency.

Referring to FIG. 4, frequency priority information affects measurement on a particular frequency by the UE. The UE always performs measurement on a frequency 430 having a higher priority than that of a current serving cell 420. However, the UE does not always perform measurement on a frequency (intra-frequency) the same as that of the serving cell 420 or a different frequency 410 having a priority the same as or lower than that of the serving cell 420 in order to save the power of the UE. In this case, measurement on the frequency 410 having the priority the same as or lower than that of the serving cell 420 may be performed when the channel quality of service (QoS) of the serving cell 420 is less than or equal to a specific threshold. Cell reselection is performed in order to move to a cell with a good channel state, and thus there is no reason to move to the frequency 410 having the same or lower priority when the channel QoS of the current serving cell 420 is good. Therefore, to reduce power consumption of the UE due to unnecessary channel measurement, it is determined whether to perform measurement, based on the specific threshold. For the frequency (intra-frequency) the same as the frequency of the serving cell 420, when the QoS of the serving cell 420 is lower than or equal to a specific first threshold (e.g., Sintrasearch) 460, channel measurement is performed on different cells of the same frequency. For the different frequency 410 having the priority the same as or lower than that of the frequency of the serving cell 420, when the QoS of the serving cell is lower than or equal to a specific second threshold (e.g., Snonintrasearch) 470, channel measurement is performed on cells 410 of the different frequency. As the channel QoS, received signal strength (reference signal received power: RSRP) and received signal quality (reference signal received quality: RSRQ) may be generally considered.

While performing the measurement in this manner, when the channel QoS of the cell 430 of the frequency having the higher priority is higher than a specific third threshold (e.g., ThreshX-high) 480, the UE may reselect the cell of the frequency having the higher priority as a serving cell. When the channel QoS of the cell 410 of the frequency having the lower priority is higher than a specific fourth threshold (e.g., ThreshX-low) 440 and the QoS of the serving cell 420 is lower than a specific fifth threshold (e.g., ThreshServing-low) 450, the UE may reselect the cell 410 of the frequency having the lower priority as a serving cell.

That is, the UE always performs inter-freq/RAT measurement for a high-priority frequency or RAT 430 regardless of the strength of a measured signal for the serving cell 420. When the strength of the measured signal for the serving cell 420 is lower than SintraSearch 460, the UE may perform intra-frequency measurement. When the strength of the measured signal for the serving cell 420 is lower than SnonintraSearch 470, the UE may perform inter-freq/RAT measurement on the frequency 410 having the priority lower than or equal to that of the frequency of the current serving cell. The reason why UE measurement is triggered by stages is to reduce power consumption of the UE due to measurement of neighboring cells. When the channel QoS of the cell 430 of the frequency having the higher priority is higher than the specific threshold ThreshX-high 480, the UE may reselect the cell 430 of the frequency having the higher priority as a serving cell. When the channel QoS of the cell 410 of the frequency having the lower priority is higher than the specific threshold ThreshX-low 440 and the QoS of the serving cell 420 is lower than ThreshServing-low 450, the UE may reselect the cell of the frequency having the lower priority as a serving cell.

In cell reselection, RSRP or RSRQ may be considered. When received signal quality, that is, RSRQ, is used, a base station may separately provide a threshold, such as Threshserving-lowQ, ThreshX-lowQ, and ThreshX-highQ, to the UE by broadcast. When received signal strength is used, Threshserving-lowP, ThreshX-lowP, and ThreshX-highP may be used in the disclosure in order to distinguish from the above parameters.

Figure 5:
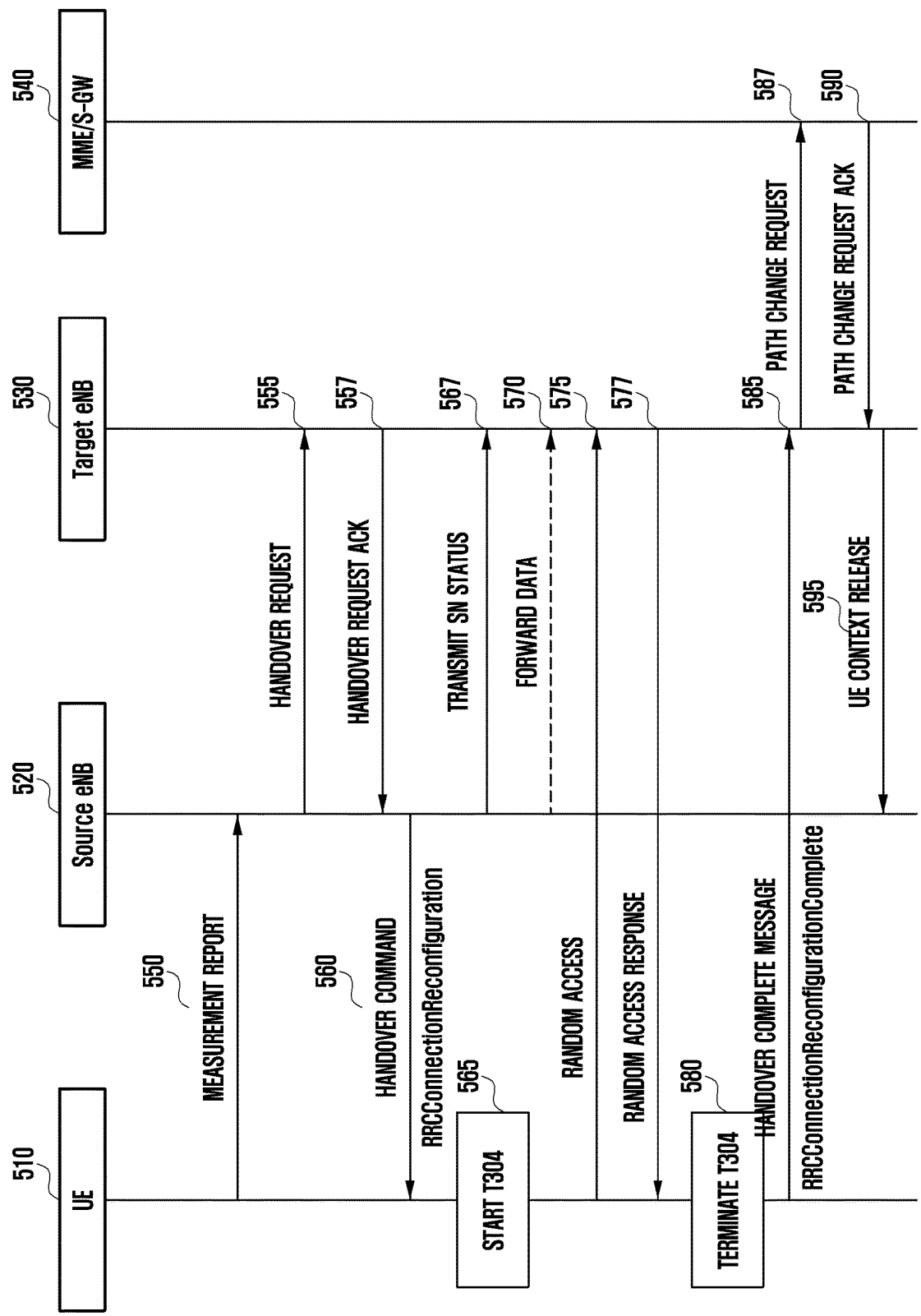
FIG. 5 illustrates an example of a handover procedure of a terminal.

FIG. 5 illustrates an example of a handover procedure of a UE.

In operation 550, the UE 510 in the connected mode may report cell measurement information (measurement report) to a current source eNB 520 periodically or when a specific event is satisfied.

The source eNB 520 may determine whether to perform a handover of the UE 510 to an adjacent cell, based on the measurement information. A handover is a technology of changing the source eNB 520 providing a service to the UE 510 in the connected mode to another eNB (i.e., a target eNB 530).

When the source eNB 520 determines to perform the handover, the source eNB 520 may transmit a handover (HO) request message to a new eNB to provide a service to the UE 510, that is, the target eNB 530, thereby requesting the handover in operation 555.

When accepting the request for the handover, the target eNB 530 may transmit a handover (HO) request acknowledgement (ack) message to the source eNB 520 in operation 557.

Upon receiving the handover request acknowledgement message, the source eNB 520 may transmit a handover (HO) command message to the UE 510 in operation 560. The HO command message may be transmitted using an RRC connection reconfiguration message transmitted by the source eNB 520 to the UE 510. Upon receiving the HO command message, the UE 510 may stop data transmission and reception with the source eNB 520 and may start a T304 timer in operation 565. The T304 timer is for enabling the UE 510 to return to an original setting of the UE and to switch to an RRC idle state when the UE 510 is not successfully handed over to the target eNB 530 for a preset time. That is, when the UE 510 is not successfully handed over to the target eNB 530 until the T304 timer expires, the UE 510 may return to the original setting and may switch to the RRC idle state.

In operation 567, the source eNB 520 may transmit a sequence number (SN) status about uplink/downlink data to the target eNB 530. Further, in an embodiment, when the source eNB 520 has downlink data to transmit to the UE 510, the source eNB 520 may transmit (forward) the downlink data to the target eNB 530 in operation 570.

In operation 575, the UE 510 may attempt random access to a target cell (target eNB) 530 indicated by the source eNB 520. The random access is for notifying the target cell 530 that the UE 510 is moved through the handover and for achieving uplink synchronization. For the random access, the UE 510 may transmit a preamble corresponding to a preamble ID provided from the source eNB 520 or a randomly selected preamble ID to the target cell 530.

After a lapse of a specified number of subframes from when the UE 510 transmits the random access preamble to the target eNB 530, the UE 510 may monitor whether a random access response (RAR) message is received from the target cell 530. A time interval in which the monitoring is performed may be referred to as a random access response (RAR) window. When an RAR is received during the specific time (operation 577), the UE 510 may transmit a handover (HO) complete message to the target eNB 530 via an RRCConnectionReconfigurationComplete message in operation 585. When successfully receiving the RAR from the target eNB 530, the UE 510 may terminate the T304 timer in operation 580.

The target eNB 530 may request a path change by transmitting a path change request message to an MME/S-GW 540 in order to change the path of bearers configured to the source eNB 520 in operation 587 and may receive a path change response (path change ACK) message in response in operation 590. In operation 595, the target eNB 530 may notify the source eNB 520 to delete UE context of the UE 510. Therefore, the UE 510 may attempt data reception with respect to the target eNB 530 from the starting point of the RAR window, and may start data transmission to the target eNB 530 upon transmitting an RRCConnectionReconfigurationComplete message after receiving the RAR.

According to the handover procedure performed in an LTE system illustrated in FIG. 5, the particular UE 510 cannot transmit or receive data thereof from the time when the UE 510 receives the HO command message (RRCConnectionReconfiguration) from the source eNB 520 to the time when the UE 510 is completely handed over to the target eNB 530 and transmits the HO complete message (RRCConnectionReconfigurationComplete). This data transmission and reception interruption state may cause a delay of a certain time in the UE 510 transmitting and receiving data. Accordingly, an embodiment of the disclosure proposes a method for minimizing a data transmission interruption and specifies the operation of the UE 510 corresponding thereto.

In a 5G system, a plurality of SS/PBCH blocks may be transmitted in a plurality of frequency bands, and SS/PBCH transmission times may be set differently depending on base stations. These various settings may help a base station in efficiently operating resources but may cause an increase in time required for a UE to initially access a network.

In addition, a UE may utilize an SS/PBCH block to measure the wireless state of a cell, in which case the UE may have difficulty in measuring the wireless state of an adjacent cell of a serving cell due to a different SS/PBCH block depending on a network configuration.

Accordingly, an embodiment of the disclosure illustrates a method and a structure for reducing time required for a UE to initially access a 5G system will be described. Further, a method for a UE to use frequency/time location information of an SS/PBCH block included in a band operated by a base station for cell measurement and rate matching is illustrated.

Figure 6A:
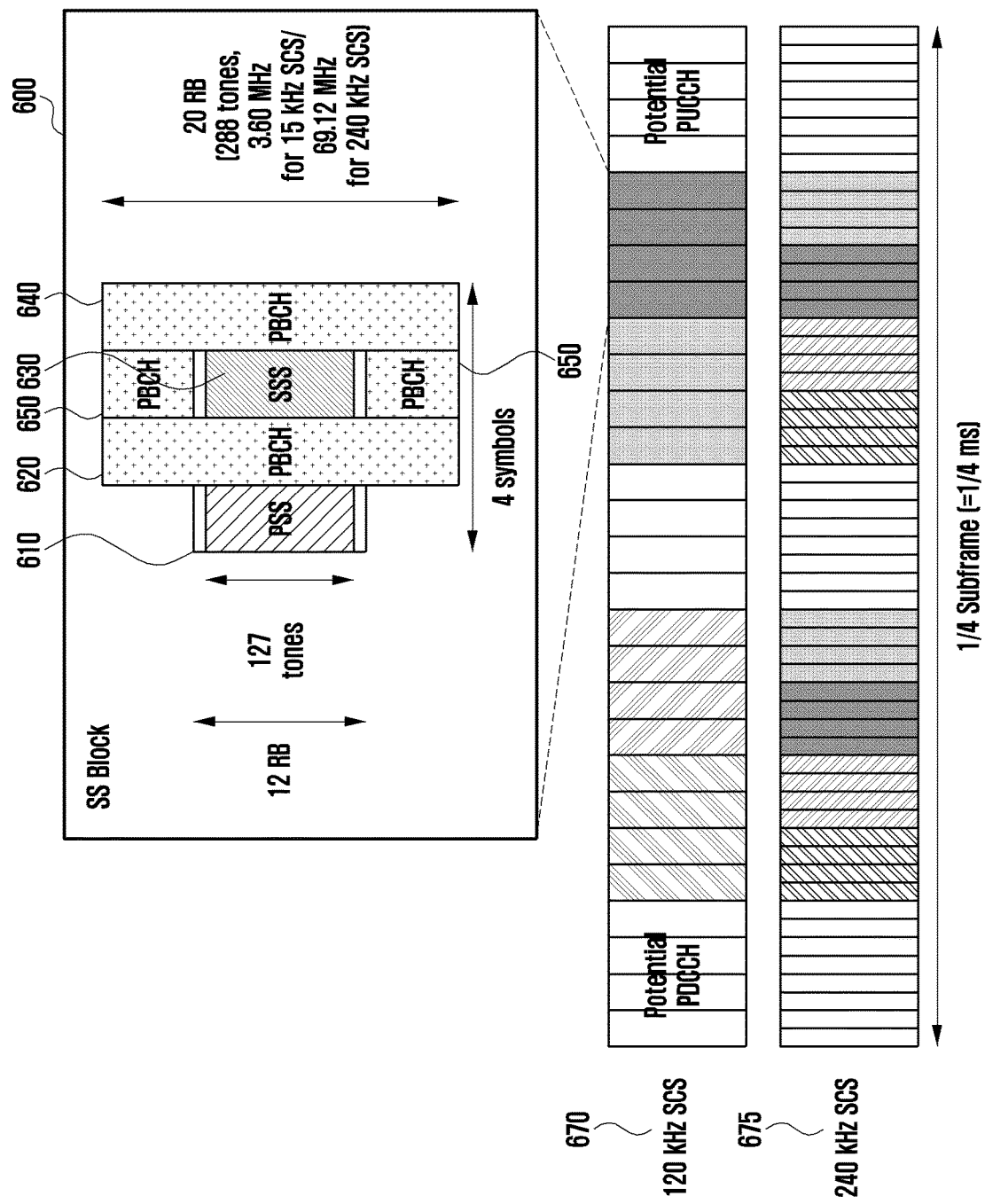
Figure 6B:
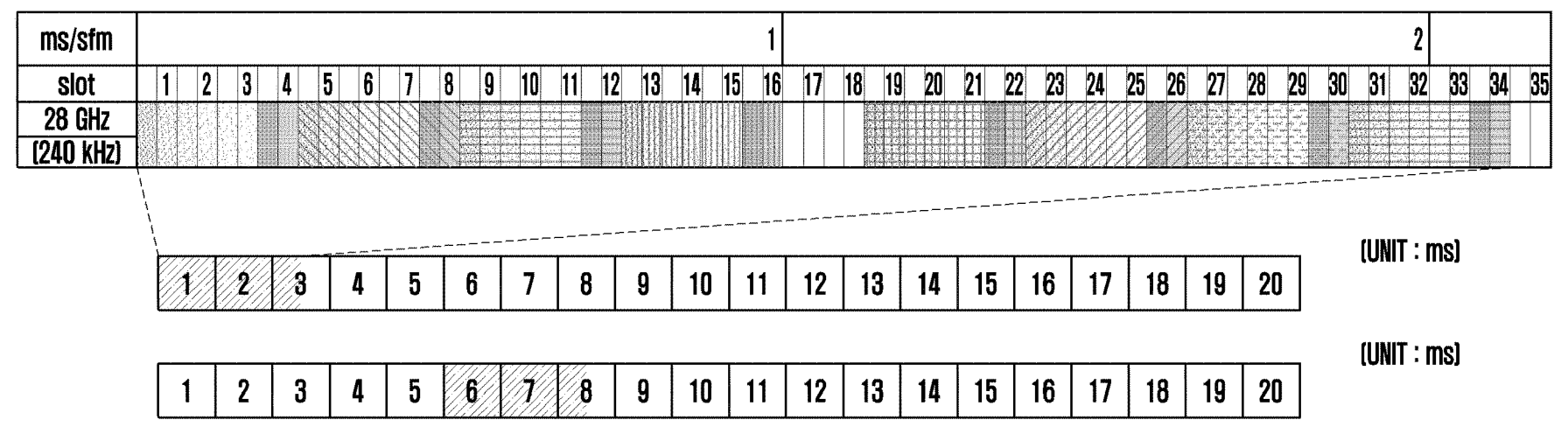
Figure 6C:
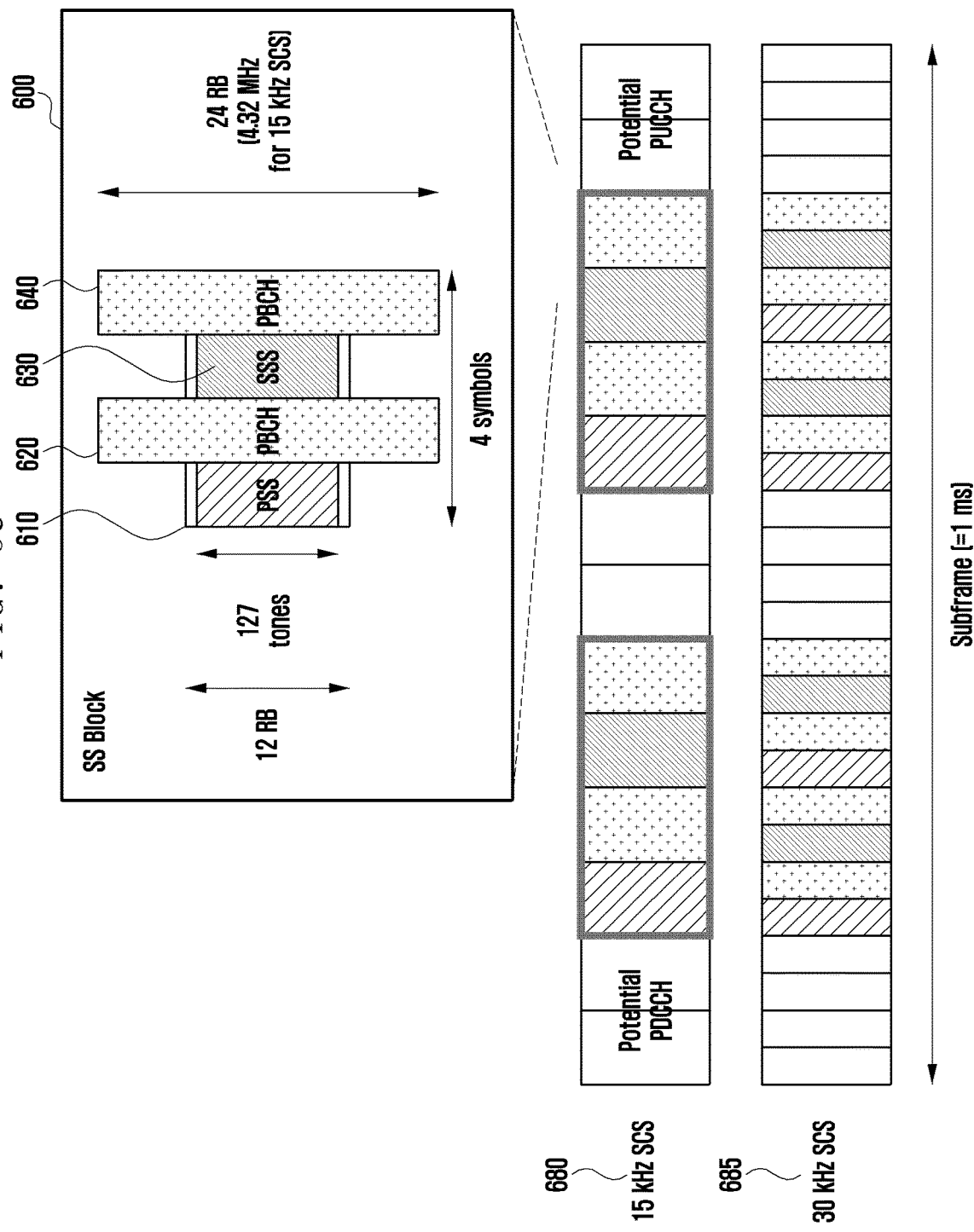
Figure 6D:
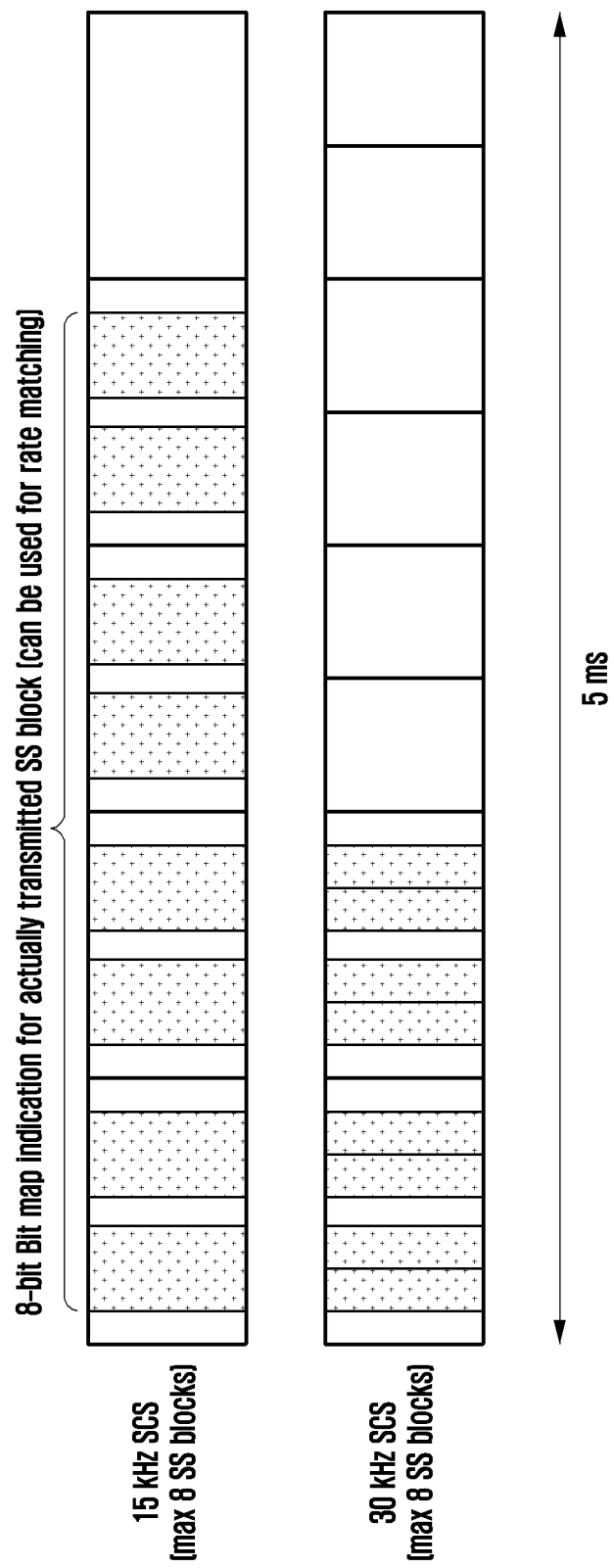
Figure 7:
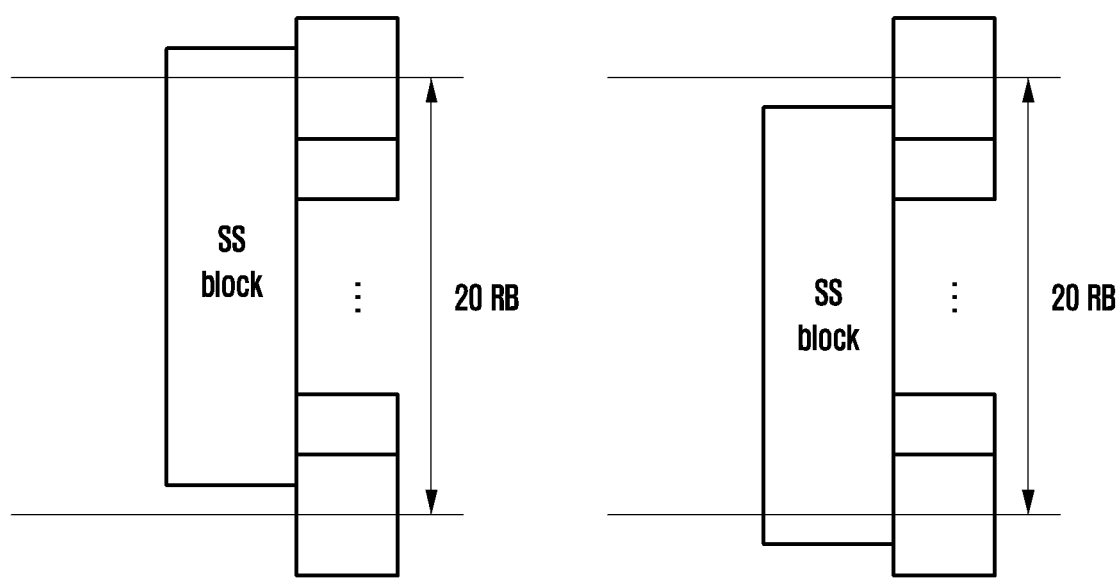
FIG. 7 illustrates an example of a method for transmitting an SS/PBCH block.

FIG. 6A to FIG. 6D illustrate an example of an SS/PBCH block according to an embodiment of the disclosure, and FIG. 7 illustrates an example of a method for transmitting an SS/PBCH block.

Referring to FIG. 6A, in a 5G system defined by the 3GPP, one or more SS/PBCH blocks 600 may be included in a wide bandwidth CC. In an SS/PBCH block, not only a PSS 610/SSS 630 but also PBCHs 620, 640, and 650 may be included and transmitted together.

The SS/PBCH block may be transmitted in a structure illustrated in FIG. 6A. The PSS 610, a first PBCH 620, the SSS 630, and a second PBCH 640 may be transmitted on different symbols, and 20 RBs may be used as a frequency to transmit the SS/PBCH block 600. Further, part 650 of a PBCH may be transmitted on a symbol through which the SSS 630 is transmitted. The centers of the PSS 610, the SSS 630, and the PBCHs 620, 640, and 650 may be aligned.

Referring to FIG. 7, when transmitting an SS/PBCH block according to the 3GPP, it is possible to transmit an SS/PBCH block with an offset according to an OFDM subcarrier grid rather than according to a resource block (RB) grid. In this case, an offset value of an applied subcarrier grid may be indicated through a PBCH.

Referring back to FIG. 6A, as indicated by 670, a candidate group location in which the SS/PBCH block 600 including four symbols can be transmitted in two consecutive slots (14 symbols) of 120 kHz may be determined. For reference, according to the 3GPP, one slot may include 14 symbols. Alternatively, one slot may include seven symbols. Further, as indicated by 675 in FIG. 6A, a candidate group location in which the SS/PBCH block 600 including four symbols may be transmitted in four consecutive slots (14 symbols) of 240 kHz may be determined. In one embodiment, as illustrated FIG. 6B, a transmission candidate group location for a total of 64 SS/PBCH blocks 600 may be determined in above 6 (240 kHz), based on an arrangement in a slot illustrated in FIG. 6A.

A time-axis transmission pattern of the SS/PBCH block 600 may be repeated every predetermined period. According to the time-axis transmission pattern, candidate locations in which the SS/PBCH block 600 can be transmitted within a slot may be determined by the 3GPP, and up to 64 SS/PBCH blocks (above 6 Ghz, 8 for below 6, 4 for below 3) may be transmitted in initial 5 ms. A network may determine an actual transmission pattern among these candidate locations. The above pattern may be repeated according to a period of 5, 10, . . . , or 160 ms, which may be determined by a base station. However, a UE may perform an initial access procedure considering that the pattern basically has a repetition period of 20 ms in an initial access procedure.

In below 6, a candidate group location in which the SS/PBCH block 600 can be transmitted may be as illustrated in FIG. 6C. In a case of 15 kHz as indicated by 680, a location in which two SS/PBCH blocks 600 can be transmitted in one slot (14 symbols) may be determined. Further, in a case of 30 kHz as indicated by 685, a location in which four SS/PBCH blocks 600 can be transmitted in two consecutive slots (14 symbols) may be determined.

In addition, as illustrated in FIG. 6D, in below 6, a location in which up to eight SS/PBCH blocks 600 can be transmitted may be determined.

A time-axis transmission pattern of the SS/PBCH block 600 may be repeated every predetermined period. According to the time-axis transmission pattern, candidate locations in which the SS/PBCH block 600 can be transmitted within a slot may be determined by the 3GPP, and up to eight SS/PBCH blocks (above 6 Ghz, 8 for below 6, 4 for below 3) may be transmitted in initial 5 ms. A network may determine an actual transmission pattern among these candidate locations. The above pattern may be repeated according to a period of 5, 10, . . . , or 160 ms, which may be determined by a base station. However, a UE may perform an initial access procedure considering that the pattern fundamentally has a repetition period of 20 ms in an initial access procedure.

A plurality of SS/PBCH blocks may be transmitted on a frequency axis within a frequency band operated by one base station. In this case, a network may determine a frequency location where an SS/PBCH block is transmitted, and a UE may detect the location using an interval for finding an SS/PBCH block defined in the standard.

In the 5G system, at least one cell may exist in a frequency band operated by one base station. For a UE, one cell may be associated with one SS/PBCH block. Such an SS/PBCH block may be referred to as an SS/PBCH block associated with a cell, an SS/PBCH block defining a cell, a cell-defining SS/PBCH block, or the like but is not limited to these terms. That is, when the UE completes DL/UL synchronization and even RRC connection/NAS connection, based on an SS/PBCH block found in a frequency detection process, the SS/PBCH block for a corresponding cell may be referred to as a cell-defining SS/PBCH block.

Figure 8:
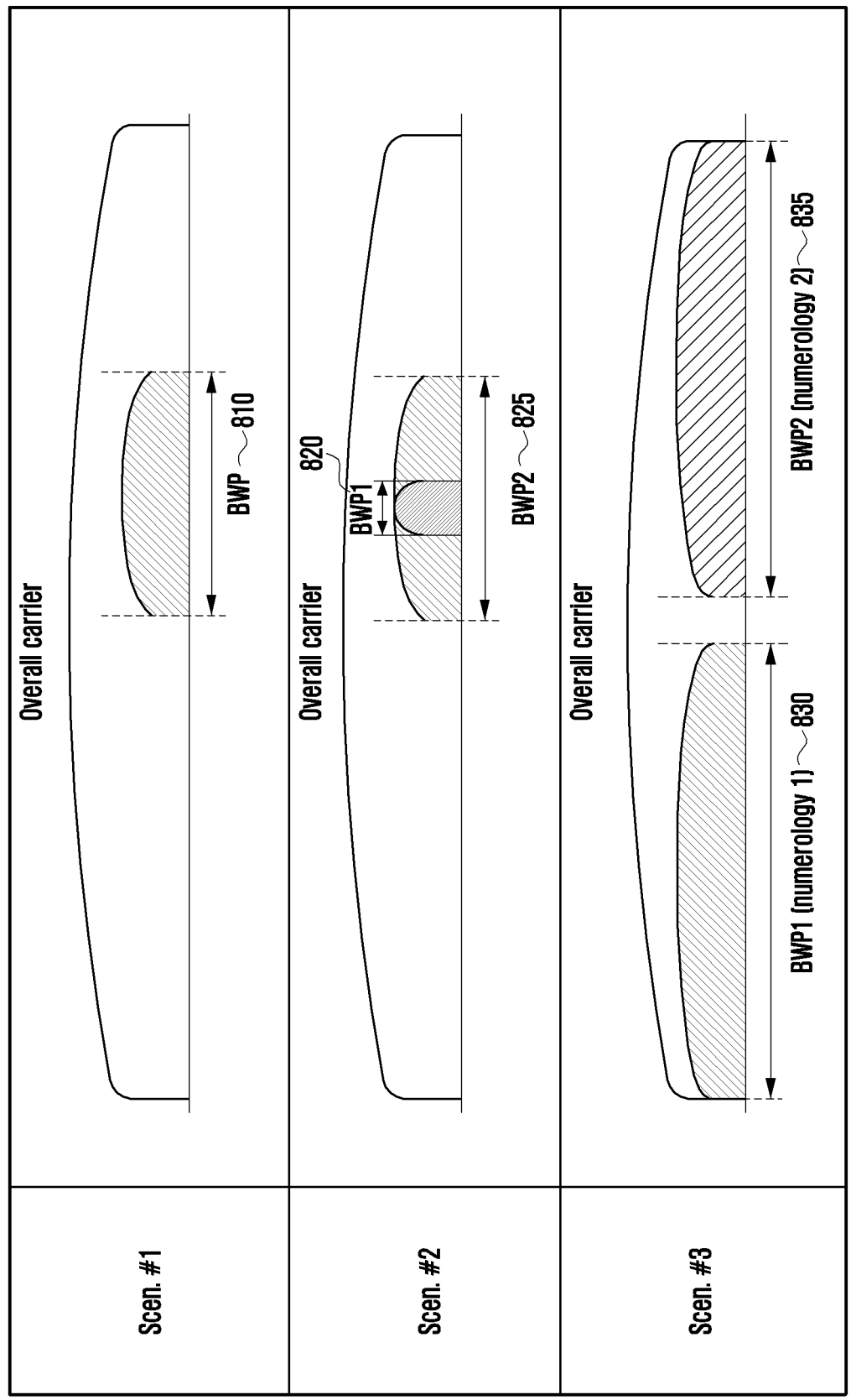
FIG. 8 illustrates an example of a bandwidth part according to an embodiment of the disclosure.

FIG. 8 illustrates an example of a bandwidth part according to an embodiment of the disclosure.

The 3GPP has introduced the concept of a bandwidth part (BWP) for bandwidth adaptation. A base station may transmit one or more pieces of bandwidth part configuration information to a UE. The bandwidth part configuration information may include a setting value necessary for the UE to operate a BWP. The bandwidth part configuration information may include at least one of the location of a frequency resource of the BWP in a system band and the bandwidth of the frequency resource and operating numerology information about the BWP. The operating numerology information about the BWP may include at least one of subcarrier spacing (SCS) information, the type of a cyclic prefix (CP) (e.g., a normal CP or an extended CP), and the number of symbols (e.g., seven symbols, 14 symbols, or the like) included in one slot.

Upon receiving the one or more pieces of bandwidth part configuration information, the UE may activate at least one BWP according to a signal from the base station. The UE may receive a control signal and data in the activated BWP.

Referring to FIG. 8, scenarios of using a BWP may be divided into three types.

In scenario 1 (Sen. #1), a basic operating band of a UE configured based on radio frequency (RF) capability, which is one of UE capabilities of the UE, is used. In one embodiment, when one BWP is configured by a base station, the UE may activate the BWP 810.

In scenario 2 (Sen. #2), an operating band 820 is additionally configured in addition to a basic operating band (BWP2) 825 of scenario 1. Although only two BWPs are illustrated in the drawing for simplicity, three or more BWPs may be configured.

In this scenario, a UE may select and activate one operating band of BWP1 820 and BWP2 825. In one embodiment, as a method for the UE to activate one of BWP1 820 and the BWP2 825, the UE may receive an RRC signal from a base station and may select an operating band to be activated, based on the RRC signal. For example, a signal for configuring BWP1 820 and BWP2 825 may include information indicating one BWP to be activated of the two BWPs. Specifically, a bit indicating activation may be included in each piece of BWP configuration information. Alternatively, it is also possible to first activate a BWP about which BWP configuration information has an index indicated by index 0 (first or 1). Alternatively, it is also possible to first activate a BWP about which BWP configuration information has an index indicated by N–1 (last or N).

In another embodiment, as a method for the UE to activate one of BWP1 820 and the BWP2 825, the UE may receive DCI from the base station and may select an operating band to be activated, based on the DCI. The DCI may include information for activating at least one BWP. When the same BWP as that already activated is indicated through the DCI, the UE may ignore a corresponding value. When a BWP different from that already activated is indicated through the DCI, the UE may activate the BWP included in the DCI after a lapse of a certain time (e.g., a slot unit or a subframe unit) from when the DCI is received. In an alternative embodiment, when it is identified that the DCI for the UE is included in a resource for transmitting a control signal, it is possible to activate a corresponding BWP.

The RRC signal may include a time pattern for changing BWP1 820 and BWP2 825. For example, a method of transmitting operating slot information or subframe information about at least one BWP to a UE through an RRC message may be used. Alternatively, a method in which a base station designates time to activate at least one BWP to a UE may be used. According to an embodiment, when a UE operating with an arbitrary BWP does not receive DCI including scheduling information for a certain period of time, a method of changing to a predetermined BWP (default BWP) is possible. Information about the predetermined BWP may be transmitted via the RRC message. In another embodiment, the predetermined BWP may be either BWP1 820 or BWP2 825.

In still another embodiment, as a method for the UE to select one of BWP1 820 and the BWP2 825, the UE may receive a MAC CE from the base station and may select an operating band to be activated, based on the MAC CE. The MAC CE may include information for activating at least one BWP. When the same BWP as that already activated is indicated through the MAC CE, the UE may ignore a corresponding value. When a BWP different from that already activated is indicated through the MAC CE, the UE may activate the BWP included in the MAC CE after a lapse of a certain time (e.g., a slot unit or a subframe unit) from when the MAC CE is received.

In scenario 3 (Sen. #3), one UE simultaneously activates different operating bands (BWP1 830 and BWP2 835) having at least two different numerology characteristics. An example is shown in which the UE activates two BWPs among a plurality of configured BWPs. The two BWPs 830 and 835 may be configured for different services (e.g., eMBB, URLLC, and the like). In another embodiment, a scenario in which a plurality of operating bands having the same numerology characteristics is simultaneously activated is possible but is not shown.

In this scenario, the UE may select and activate BWP1 830 and BWP2 835 among at least two or more configured BWPs. In one embodiment, as a method for the UE to activate one of BWP1 830 and the BWP2 835, the UE may receive an RRC signal from the base station and may select an operating band to be activated, based on the RRC signal. For example, a signal for configuring a BWP may include information for activating the two BWPs 830 and 835. Specifically, a bit indicating activation may be included in each piece of BWP configuration information. Alternatively, it is also possible to first activate BWPs about which BWP configuration information has indexes indicated by index 0 and 1 (first and second or 1 and 2). Alternatively, it is also possible to first activate BWPs about which BWP configuration information has indexes indicated by N−2 and N−1 (last and last−1 or N and N−1).

The RRC signal may include a time pattern for activating BWP1 830 and BWP2 835. For example, a method of transmitting operating slot information or subframe information about at least one BWP to a UE through an RRC message may be used. Alternatively, a method in which a base station designates time to activate at least one BWP to a UE may be used.

In another embodiment, as a method for the UE to activate BWP1 830 and the BWP2 835, the UE may receive DCI from the base station and may select an operating band to be activated, based on the DCI. The DCI may include information for activating at least one BWP. When the same BWP as that already activated is indicated through the DCI, the UE may ignore a corresponding value. When a BWP different from that already activated is indicated through the DCI, the UE may activate the BWP included in the DCI after a lapse of a certain time (e.g., a slot unit or a subframe unit) from when the DCI is received. In an alternative embodiment, when it is identified that the DCI for the UE is included in a resource for transmitting a control signal, it is possible to activate a corresponding BWP.

In still another embodiment, as a method for the UE to activate BWP1 830 and the BWP2 835, the UE may receive a MAC CE from the base station and may select an operating band to be activated, based on the MAC CE. The MAC CE may include information for activating at least one BWP. When the same BWP as that already activated is indicated through the MAC CE, the UE may ignore a corresponding value. When a BWP different from that already activated is indicated through the MAC CE, the UE may activate the BWP included in the MAC CE after a lapse of a certain time (e.g., a slot unit or a subframe unit) from when the MAC CE is received.

In the 5G system, SS/BPCH blocks other than a cell-defining SS/PBCH block may exist in an operating frequency band of a UE. The operating frequency band of the UE may be the frequency band of a bandwidth part (BWP) in which the UE operates. The operating frequency band may be a frequency band including all BWPs in which the UE operates. Alternatively, the operating frequency band may be a frequency band having a frequency bandwidth transmitted to a base station through UE capability with an SS/PBCH block at the center. Alternatively, the operating frequency band may be a default BWP in which the UE operates. Alternatively, the operating frequency band may be a frequency band including at least one of BWPs configured for the UE.

In this case, the UE needs to be able to apply rate matching SS/BPCH blocks included in the operating frequency band of the UE among SS/PBCH blocks other than the cell-defining SS/PBCH block when the UE transmits and receives data. To this end, a method is possible in which a network designates the transmission location of the SS/PBCH block as a reserved resource and reports the same using at least one signal of RRC signaling, a medium access control (MAC) control element (CE), and downlink control information (DCI).

That is, a cell-defining SS/PBCH block detected by a UE and used for synchronization, RRC connection, and NAS connection may be defined in an operating frequency band of the UE. Further, a plurality of SS/PBCH blocks including the cell-defining SS/PBCH block may exist in the operating frequency band of the UE. In addition, a frequency band (wide band CC) operated by a base station including the operating frequency band of the UE may include a larger number of SS/PBCH blocks including the plurality of SS/PBCH blocks included in the frequency band in which the UE operates. Furthermore, an entire frequency band including the frequency band operated by the base station may include a larger number of SS/PBCH blocks than the number of SS/PBCH blocks existing in the frequency band operated by the base station.

To change the cell-defining SS/PBCH block to another SS/PBCH block, the UE needs to undergo a handover procedure or a SCell release/add process.

An SS/PBCH block may be transmitted from one base station to a UE through multiple beams. According to an embodiment, the base station may transmit one SS/PBCH block using the same beam and may transmit another SS/PBCH block through another beam. In a process of receiving an SS/PBCH block, the UE may measure the strength of a corresponding beam. The UE may select at least one of SS/PBCH blocks having a beam strength of a predetermined threshold or higher, based on the measured strength of the beam. According to a selection criterion, beams may be arranged according to beam strength and the UE may select the strongest beam. The UE may transmit an RACH to the base station using at least one of an RACH resource and a preamble ID associated with an SS/PBCH block transmitted through a selected beam. The base station may identify the beam selected by the UE among beams transmitted by the base station through at least one of the RACH resource and the preamble ID transmitted by the UE.

Figure 9:
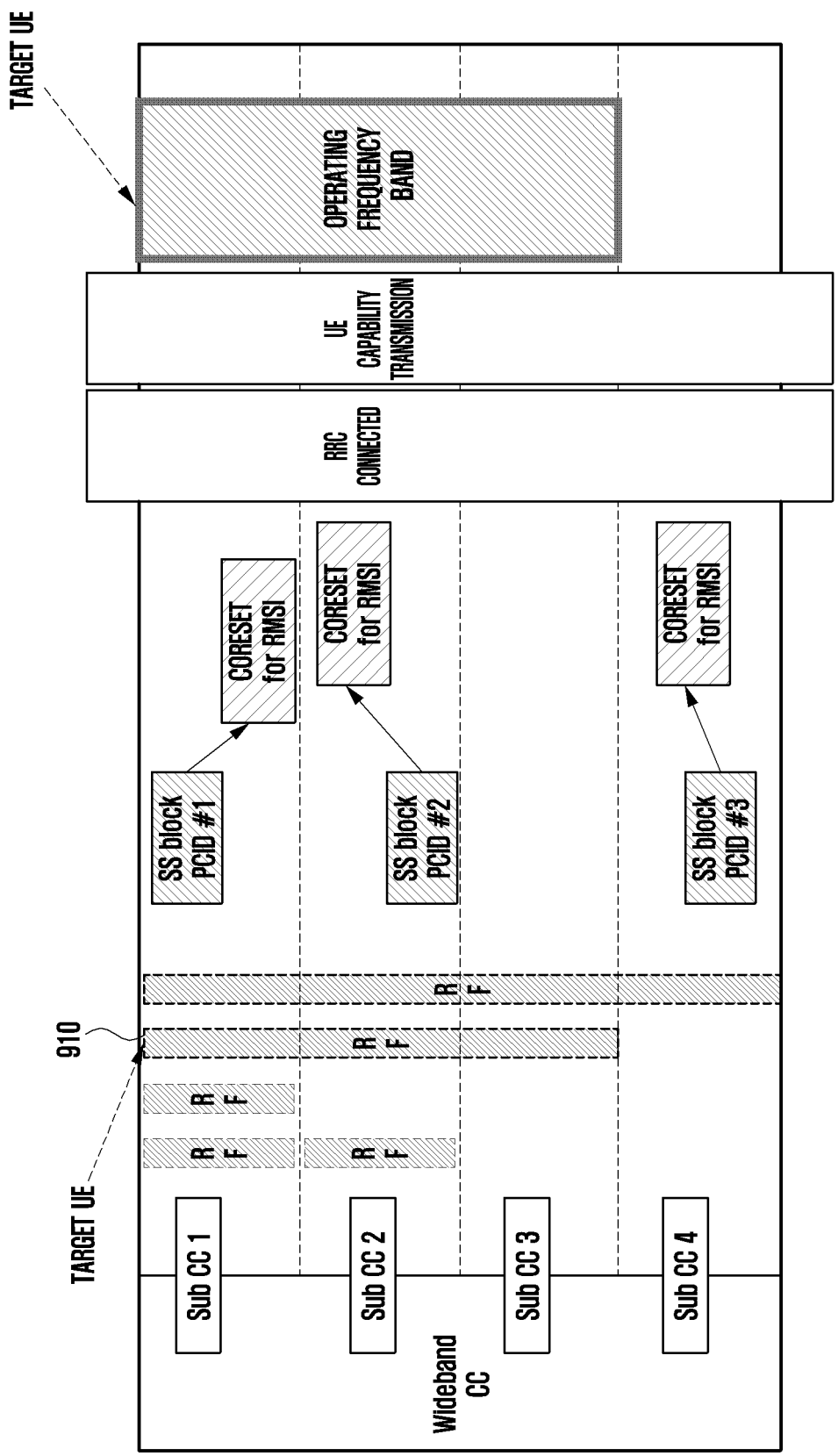
FIG. 9 illustrates an example of a frame structure according to an embodiment of the disclosure.

FIG. 9 illustrates a frame structure according to an embodiment of the disclosure.

Referring to FIG. 9, a plurality of sub-operating frequency bands (sub CCs) may be included in an operating frequency band (wideband CC) of a base station. For example, four sub-operating frequency bands, which are sub CC1, sub CC2, sub CC3, and sub CC4, are illustrated, but the disclosure is not limited thereto. Alternatively, three or less or five or more sub-operating frequency bands may be included in the operating frequency band of the base station.

RF capability 910, which is one of UE capabilities, means a bandwidth (BW) that a UE can support using one RF. In FIG. 9, it is assumed that a UE (target UE) supports three consecutive CCs (sub CC1, sub CC2, and sub CC3) through one RF. Accordingly, an operating frequency band of the UE may be a frequency band including sub CC1, sub CC2, and sub CC3.

In FIG. 9, it may be assumed that SS/PBCH blocks exist in sub CC 1, sub CC 2, and sub CC 4. In addition, it is assumed that the SS/PBCH block of sub CC 2 is a cell-defining SS block of the target UE.

In FIG. 9, physical cell identity (PCID) #1, PCID #2, and PCID #3 in the respective SS/PBCH blocks existing in sub CC 1, sub CC 2, and sub CC 4 may be the same value or different values. Further, at least two PCIDs may be the same. For example, PCID #1 and PCID #2 of SS/PBCH block 1 and SS/PBCH block 2 in consecutive sub CC 1 and sub CC 2 have the same value, and PCID #3 of SS/PBCH block 3 in sub CC 4 may have a different value.

Figure 10:
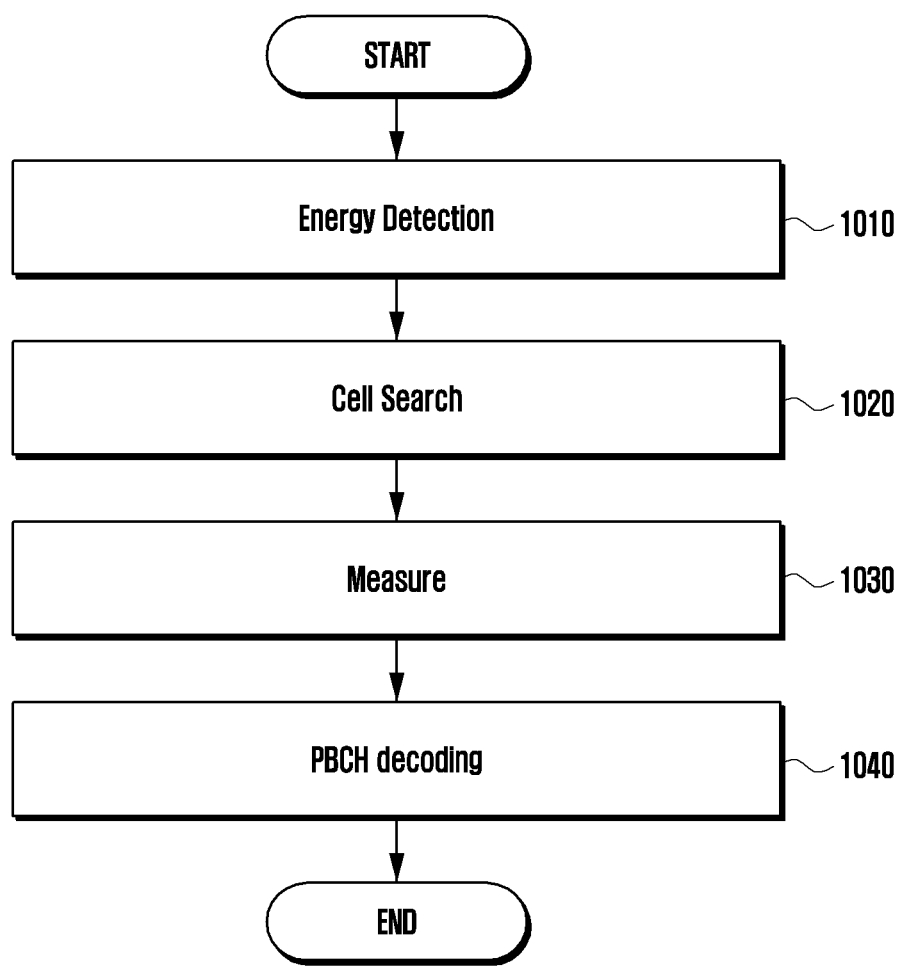
FIG. 10 illustrates an example of an initial access procedure according to an embodiment of the disclosure.

FIG. 10 illustrates an example of an initial access procedure according to an embodiment of the disclosure. The initial access procedure may be performed when a UE is powered on and first camps on a cell. The initial access procedure may also be performed when changing a PLMN. Further, the initial access procedure may be performed when a UE camps on a cell again after missing a network. In addition, the initial access procedure may be performed when a UE camps on a cell in a moved area after moving in an idle state.

The initial access procedure of a UE will be described with reference to a system assumed to be related to FIG. 9. This procedure is one possible scenario among various possibilities, and the disclosure is not limited thereto.

Referring to FIG. 10, in operation 1010, the UE may perform energy detection and may perform an SS/PBCH block search. The UE may detect an SS/PBCH block in a carrier frequency band using synchronization signal (SS) raster information. The SS raster information is information indicating a location at which a synchronization signal can be detected and may be, for example, a global synchronization channel number (GSCN). Accordingly, in the scenario of FIG. 9, the UE may detect a PSS and an SSS in sub CC 2.

According to an embodiment, the UE may detect a plurality of SS/PBCH blocks included in the band, based on the sequence of the PSS and may select one SS/PBCH block from among the plurality of detected SS/PBCH blocks.

According to an embodiment, the UE may select an SS/PBCH block having the most correlation peak value. Alternatively, the UE may select an SS/PBCH block having the highest signal-to-noise ratio (SNR)/received signal strength indicator (RSSI).

When SS/PBCH blocks are transmitted through multiple beams, the UE may select one of SS/PBCH blocks received through a reception (Rx) beam of the UE.

In operation 1020, the UE may perform a cell search. The UE may identify whether there is a cell mapped to the PSS and the SSS detected in operation 1010 using known PSS and SSS sequences. According to this process, the PCID of a corresponding cell may be detected. Further, a process of achieving downlink synchronization (DL sync) may be performed simultaneously with or before and after this process.

In operation 1030, the UE may perform measurement. The UE may calculate or measure quality, based on the RSRP of the selected SS/PBCH block and the RSRP of a PBCH DMRS identified based on the determined PCID. This process may be performed before operation 1020, simultaneously with operation 1020, or after operation 1020.

In operation 1040, the UE may decode a PSS/SSS and a PBCH in the SS/PBCH block detected in operation 1020. According to the scenario of FIG. 9, the UE may decode the PSS/SSS and PBCH in the SS/PBCH block in sub CC 2.

The UE may obtain CORESET information related to maintenance minimum system information (RMSI) from the PBCH. The UE may obtain RMSI data by decoding a CORESET related to the RMSI, based on the obtained information. The UE may obtain RACH configuration information from the RMSI. The UE may perform an RACH procedure, based on the RACH configuration information found in the RMSI. When the UE receives an RRC configuration message through MSG 4 during the RACH procedure, the RRC state of the UE may be changed to an RRC_CONNECTED state.

The UE may identify the temporal location of the SS/PBCH block actually transmitted from a network, which is included in the RRC reconfiguration message.

The UE changed to the RRC_CONNTECTED state may transmit UE capability information. The UE capability may include information about a bandwidth at which the UE can operate and information about a band in which the UE can operate. In addition, the UE capability may include time required for the UE to process received data. Specifically, the UE capability may include information about time required for the UE to process received scheduling information for uplink data and to transmit uplink data based on the scheduling information. Further, the UE capability may include time required for the UE to process received downlink data and to transmit an ACK/NACK of the downlink data based thereon. In addition, the UE capability may include information about a combination of bands that can be subjected to carrier aggregation by the UE. Subsequently, an operating bandwidth corresponding to UE RF capability may be set as an operating bandwidth of the UE through the RRC reconfiguration message. For example, referring to the scenario of FIG. 9, sub CC 1 to sub CC 3 may be set as the operating bandwidth of the UE.

One or more bandwidth parts may be configured (at least one BWP may be configured in a band including sub CC 1 to sub CC 3 in the scenario of FIG. 9) through the RRC reconfiguration message, and the UE may receive information about a neighboring cell to be measured included in the RRC reconfiguration message.

Figure 11:
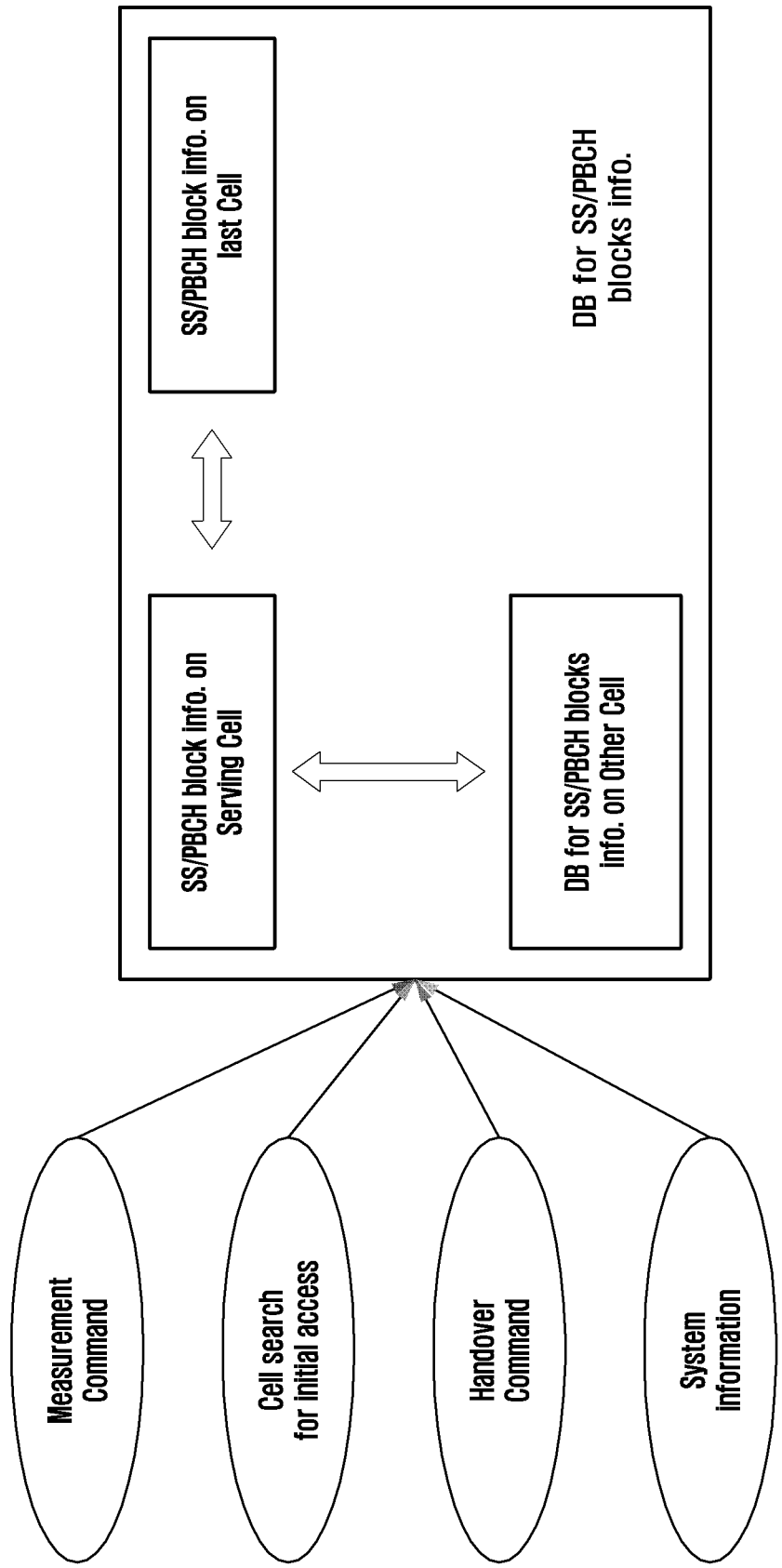
FIG. 11 illustrates an example of storing information about an SS/PBCH block according to an embodiment of the disclosure.
Figure 12:
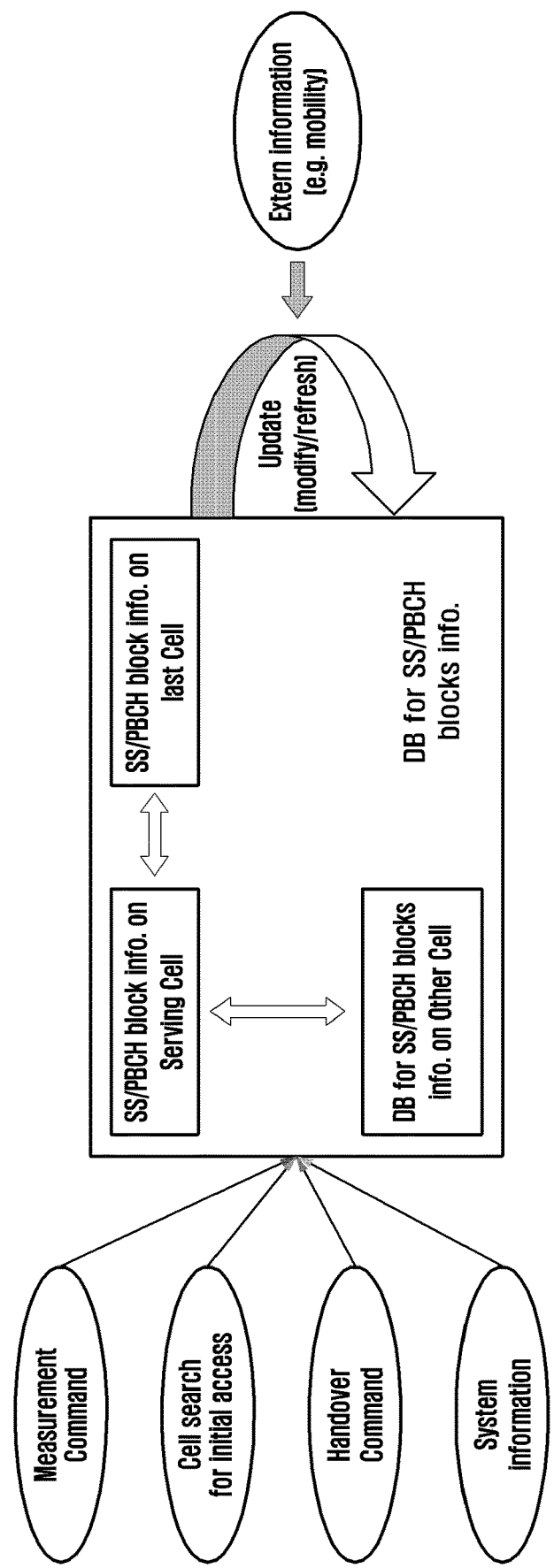
FIG. 12 illustrates an example of updating information about an SS/PBCH block according to an embodiment of the disclosure.

FIG. 11 illustrates an example of storing information about an SS/PBCH block according to an embodiment of the disclosure, and FIG. 12 illustrates an example of updating information about an SS/PBCH block according to an embodiment of the disclosure.

Referring to FIG. 11, a UE according to an embodiment of the disclosure may store information about a synchronization signal (e.g., an SS/PBCH block), for example, time information and/or frequency information about the SS/PBCH block. That is, the UE may store at least one of the time information and the frequency information about the SS/PBCH block.

The UE may store time information and/or frequency information about SS/PBCH blocks of a serving cell. Here, the SS/PBCH blocks of the serving cell may include a cell-defining SS/PBCH block and an SS/BPCH block included in an operating frequency band of the UE other than the cell-defining SS/PBCH block.

When the UE stores at least one of time information and/or frequency information about an SS/PBCH block of a cell on which the UE camps last, the UE may quickly find the SS/PBCH block using the stored information in a cell search in a next bootup process. Further, when storing at least one of time information and/or frequency information about the SS/PBCH block included in the operating frequency band of the UE other than the cell-defining SS/PBCH block, the UE may quickly find the SS/PBCH block using the stored information in a cell search in a next bootup process.

In a cell search process, the UE can detect one PSS using a fast Fourier transform (FFT) at each PSS candidate location. In another embodiment, it is also possible for the UE to attempt PSS detection using the FFT once at a candidate location of a PSS included in a plurality of SS/PBCH blocks included in UE capability. In particular, this method may also be applied when the UE stores the frequency location of an SS/PBCH block according to the disclosure.

As in the LTE system, a method in which the UE stores at least one of the absolute radio-frequency channel number (ARFCN) and the PCID of the last camped-on cell is also possible.

In addition, the UE may store time information and/or frequency information about an SS/PBCH block of a neighboring cell other than the SS/PBCH block of the camped-on cell.

When the UE stores at least one of the time information and/or frequency information about the SS/PBCH block of the neighboring cell (in terms of frequency) other than the SS/PBCH block of the last camped-on cell, the UE may quickly find the SS/PBCH block using the stored information in a cell search in a next bootup process.

In a cell search process, the UE can detect one PSS at each PSS candidate location. In another embodiment, it is also possible for the UE to attempt PSS detection once at a candidate location of a PSS included in a plurality of SS/PBCH blocks included in UE capability. In particular, this method may also be applied when the UE stores the frequency location of an SS/PBCH block according to the disclosure.

Particularly, regarding a different SS/PBCH block in a system band operated by the same base station, the UE may use information about the different SS/PBCH block in the system band for PSS detection with high priority.

The UE may identify in advance the actual transmission location of an SS/PBCH block located in a different frequency band other than an SS/PBCH block used in initial access among SS/PBCH blocks included in the operating frequency band of the UE and may perform rate matching in transmitting and receiving data.

The UE may identify in advance the actual transmission location of the SS/PBCH block located in the different frequency band other than the SS/PBCH block used in initial access among the SS/PBCH blocks included in the operating frequency band of the UE and may perform measurement.

When the UE performs measurement, based on an SS/PBCH block that is included in the operating frequency of the UE but does not belong to an activated bandwidth part, the UE may perform measurement, based on previously stored information.

Information about an SS/PBCH block stored in the UE may include at least one of the following pieces of information.

A PCID indicated by a PSS/SSS of the SS/PBCH block

The frequency location of the SS/PBCH block, for example, RB grid or OFDM grid

Actual transmission time information about the SS/PBCH block, which may be indicated, for example, by the index of a possible location of the SS/PBCH block.

Time information about the SS/PBCH block that the UE needs to measure, which may be indicated, for example, by the index of a possible location of the SS/PBCH block.

Whether the SS/PBCH block is for the 5G system or RAT information

Information about a cell-defining SS/PBCH block of the last camped-on cell of the UE and indication of whether the information about the SS/PBCH block is related to the cell-defining SS/PBCH block Indication of whether the information about the SS/PBCH block is related to an SS/PBCH block included in the operating band of the UE Indication of whether the information about the SS/PBCH block is related to an SS/PBCH block included in a UE-specific cell Indication of whether the information about the SS/PBCH block is related to an SS/PBCH block included in a wideband CC to which the operating band of the UE belongs Indication of whether the information about the SS/PBCH block is related to a cell-defining SS/PBCH block A method of indexing the frequency location of the SS/PBCH block may include a method of indexing offset information from a reference point (e.g., ARFCN, center frequency, or the like) based on a synchronization raster. In another embodiment, a method of providing offset information per OFDM subcarrier is possible. In still another embodiment, a method of providing offset information per RB and per OFDM subcarrier is also possible.

In addition, when the UE knows the time transmission location of an SS/PBCH block, the UE may use information about the time transmission location of the SS/PBCH block to identify the transmission interval of the SS/PBCH block. For example, when l=2, 4, 6, or 8, the UE can find the SS/PBCH block every two transmittable locations. Since the actual transmission location of the SS/PBCH block can be identified through an RMSI, the UE may use the information about the time transmission location of the SS/PBCH block to detect the SS/PBCH block before obtaining information about the transmission location of the SS/PBCH block.

According to an embodiment, in a method in which a UE indicates the actual time transmission location of an SS/PBCH block, the UE may consider that SS/PBCH blocks belonging to the same wideband CC have the same actual time transmission location. In another embodiment, the UE may consider that SS/PBCH blocks having the same PCID have the same actual time transmission location. In still another embodiment, the UE may consider that SS/PBCH blocks belonging to the operating frequency bandwidth of the UE have the same actual time transmission location.

It is also possible to transmit, to the UE, an RRC reconfiguration message including the frequency location (e.g., ARFCN) of an SS/PBCH block belonging to the operating frequency bandwidth of the UE and actual transmission time information about a corresponding SS/PBCH block in each frequency band.

The content described above may be managed in an SS/PBCH block information database (DB) as illustrated in FIG. 11. 'SS/PBCH block information on serving cell' may store pieces of information about an SS/PBCH block of a cell on which the UE is currently camping on.

The information included in this DB may include 'time information about an SS/PBCH block actually transmitted' of a corresponding cell. The information may be transmitted to the UE through an RMSI and an RRC message transmitted from the network. The maximum number of candidates for transmitting the SS/PBCH block may be 4 in a below 3G system, 8 in a below 6G system, and 64 in an above 6G system. Further, in the below 6G system, the actual transmission location may be transmitted in the form of an 8-bit bitmap in an RMSI. In the above 6G system, the actual transmission location of the SS/PBCH block may be transmitted to the UE in the form of an 18-bit bitmap in an RMSI. Here, a method may be used in which SS/PBCH blocks are divided into eight groups and transmission is assumed to be performed in the same pattern for each group. Subsequently, among 16 bitmaps, eight bitmaps may be used to indicate a transmitted group, and eight bits may be used to indicate the actual transmission location of an SS/PBCH block in a group. The UE may store these pieces of time information about SS/PBCH blocks in the DB by connecting the frequency location of each SS/PBCH block and cell identification information (cell ID). In another embodiment, since the time locations of the SS/PBCH blocks may have the same configuration at the same frequency, the UE may configure the DB according to the frequency.

During an initial access procedure, the UE may detect a candidate frequency location for an SS/PBCH block through energy detection. Here, the UE may directly store the detected candidate frequency location for the SS/PBCH block in the DB. In another embodiment, regarding a stored frequency location, the UE may identify that the stored frequency location corresponds to a 5G cell through at least one of a handover command, system information, and a measurement command. When the UE identifies that the stored frequency corresponds to the 5G cell, the UE may displays an indication that the stored frequency information corresponds to the 5G cell in the DB. In another embodiment, regarding a stored frequency location, the UE may identify that the stored frequency location corresponds to a cell other than a 5G cell through at least one of a handover command, system information, and a measurement command. In this case, the UE may display information about a wireless communication system other than the identified 5G cell (i.e., RAT information) in the DB in association with the stored frequency information or may delete the frequency information from the DB. In still another embodiment, the UE may store, in the DB, only frequency information about an SS/PBCH block which is identified to correspond to a 5G cell through at least one of PSS identification, SSS identification, and PBCH information identification among candidate frequency locations for a detected SS/PBCH block.

The UE may store, in the DB, SS/PBCH block information received through a handover command or a measurement command during a handover procedure. In this case, the UE may receive information about the time location of an SS/PBCH block that the UE needs to measure in a bitmap form through an RRC message. In addition, the UE may also store the information about the time location of the SS/PBCH block that the UE needs to measure in the DB. In another embodiment, since the time location of the SS/PBCH block may have the same configuration at the same frequency, the UE may configure the DB according to the frequency.

Frequency information included in a measurement object may be defined by an index that can specify the frequency location of one sub CC. The frequency information may specify the frequency location of an SS/PBCH block. For example, the frequency information included in the measurement object may specify the frequency location of an SS/PBCH block, based on an ARFCN and offset information.

The UE may identify an ARFCN included in the same wideband CC among neighboring cell information defined in measurement configuration information included in the RRC reconfiguration message. In addition, the UE may determine the frequency location of an SS/PBCH block by identifying an ARFCN belonging to the operating bandwidth of the UE in the same wideband CC and the offset of the SS/PBCH block.

A base station may notify the UE of information about a 5G cell adjacent to a cell transmitting an SIB through system information and may also transmit information about an SS/PBCH block associated with the cell to the UE. The UE may store frequency information about the SS/PBCH block received through the system information in the DB.

The UE may determine that SS/PBCH blocks having the same PCID information are included in the same wideband CC through the above processes. The UE may consider that SS/PBCH blocks included in the operating frequency band of the UE are included in the same wideband CC.

In another embodiment, the UE may identify that the SS/PBCH block detected through the initial access procedure corresponds to the 5G cell and may store this information in the DB. The UE may determine that SS/PBCH blocks having the same PCID information are included in the same wideband CC through the above processes.

A method of indexing the frequency location of the SS/PBCH block may include a method of indexing offset information from a reference point (e.g., ARFCN, center frequency, or the like) based on a synchronization raster. In another embodiment, a method of providing offset information per OFDM subcarrier is possible. In still another embodiment, a method of providing offset information per RB and per OFDM subcarrier is also possible.

Referring to FIG. 12, at least one of the frequency information and/or time information about the SS/PBCH block may be semi-statically changed according to a base station configuration. In one embodiment, an RMSI value may be changed. In another embodiment, at least one of the frequency information and/or the time information may be changed by RRC signaling. When the UE receives an SS/PBCH block and relevant information by at least one of the above methods, the UE may change at least one of the frequency information and/or time information about the SS/PBCH block stored in the DB.

In another embodiment, the UE may update the DB due to information outside the DB (external information). The updating may include a method of modifying or deleting information about at least some of data included in the DB. The information outside the DB may be information about different sensors included in the UE including the DB. Examples of the sensors may include a GPS, an acceleration sensor, a geomagnetic sensor, and the like.

The DB may vary according to location information about the UE. When PLMN information registered by the UE is changed, the UE may not use the stored DB. In an embodiment of a method of not using the DB, the UE may temporarily ignore stored DB information. For example, when the UE accesses a PLMN different from a home PLMN (roaming case), the UE may temporarily not use the DB information. In another embodiment of the method of not using the DB, the UE may flush the stored DB information. For example, when the UE registers a PLMN different from the home PLMN (roaming case), the UE may delete the DB information, and may re-record information about an SS/PBCH block according to an embodiment. In addition, the UE may also store PLMN information in the DB information and may use only information about an SS/PBCH block belonging to a PLMN that matches the registered PLMN.

In another embodiment, when the UE moves outside a region set by an upper layer of the network, such as random access (RA) or tracking area (TA), the UE may not use the DB. In an embodiment of a method of not using the DB, the UE may temporarily ignore the stored DB information. For example, when the UE accesses a region different from the region set by the upper layer of the network, such as RA or TA, the UE may temporarily not use the DB information. In another example of the method of not using the DB, the UE may flush the stored DB information. For example, when the region set by the upper layer of the network, such as RA or a TA, is changed, the UE may delete the DB information, and may re-record information about an SS/PBCH block according to an embodiment. In addition, the UE may also store information about the region set by the upper layer of the network, such as RA and TA, in the DB information and may use only current RA or TA information and information about an SS/PBCH block belonging to the region set by the upper layer of the network, such as RA and TA.

In another embodiment, the UE may have one or more DBs in consideration of a user's movement pattern. For example, the UE may generate and manage a separate DB according to a place where the user (i.e., the UE) stays for a predetermined time or longer according to the user's movement pattern. In a specific embodiment, the UE may additionally generate a DB associated with a corresponding location using time for which the user stays in an office and location information about the office and may store the DB. Further, the UE may additionally generate a DB associated with a corresponding location using time for which the user stays at home and location information about the home and may store the DB. At least one of the DBs may be generated differently from the DB associated with the last camped cell. In addition, the UE may use at least one of data stored in the DBs for the initial access procedure.

Figure 13:
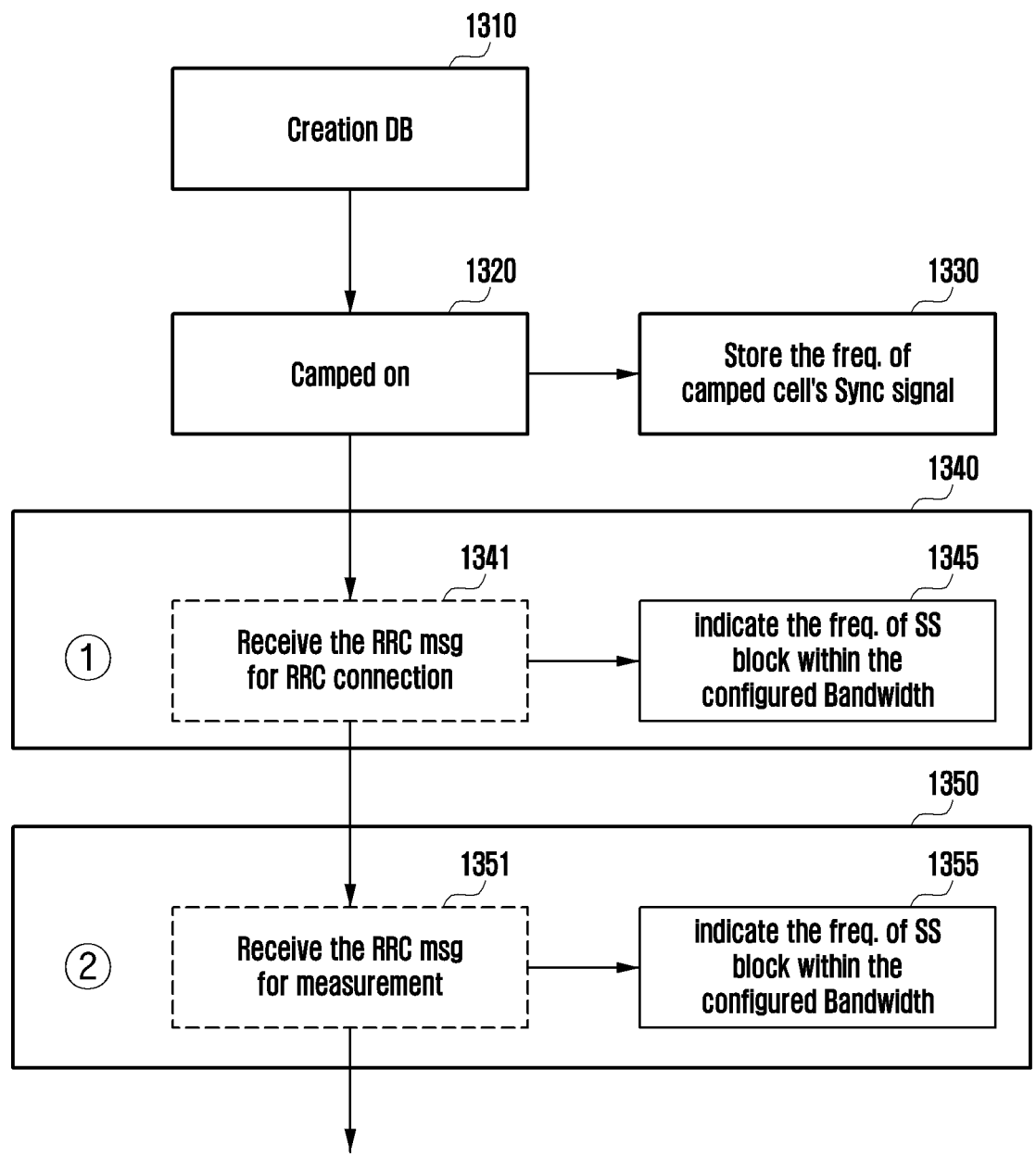
FIGS. 13, 14, and 15 illustrate an example of a method in which a terminal stores SS/PBCH block information according to an embodiment of the disclosure.
Figure 14:
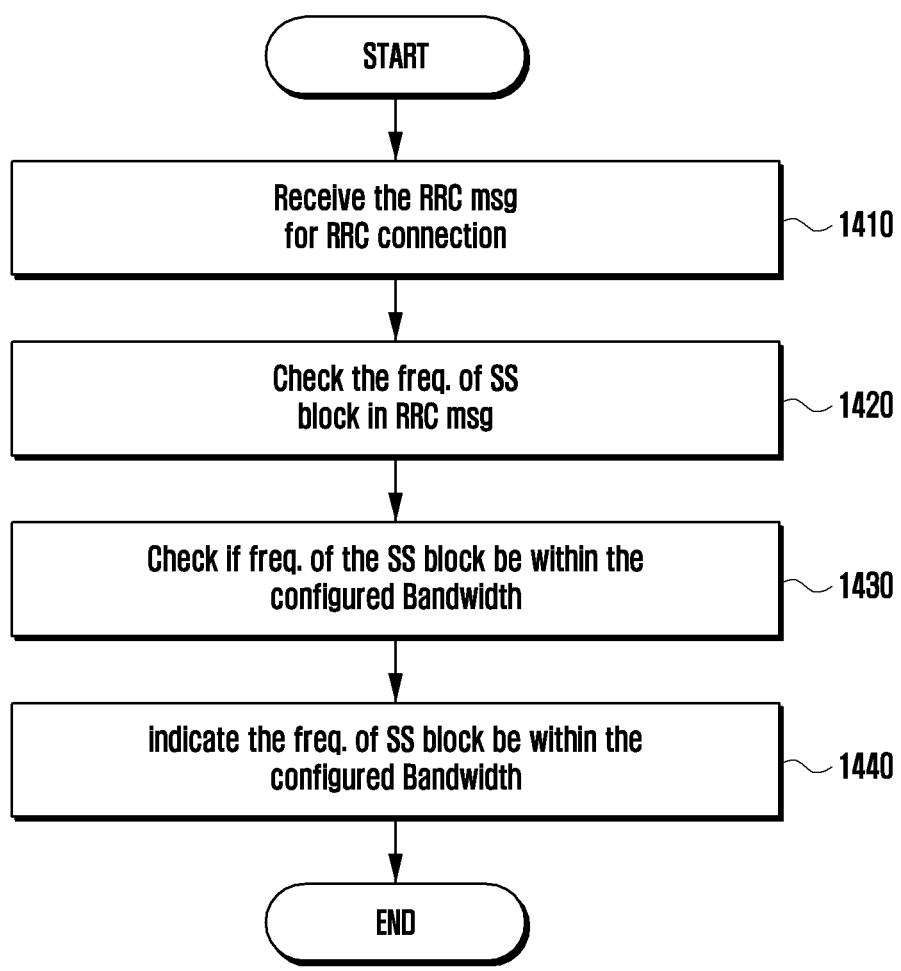
Figure 15:
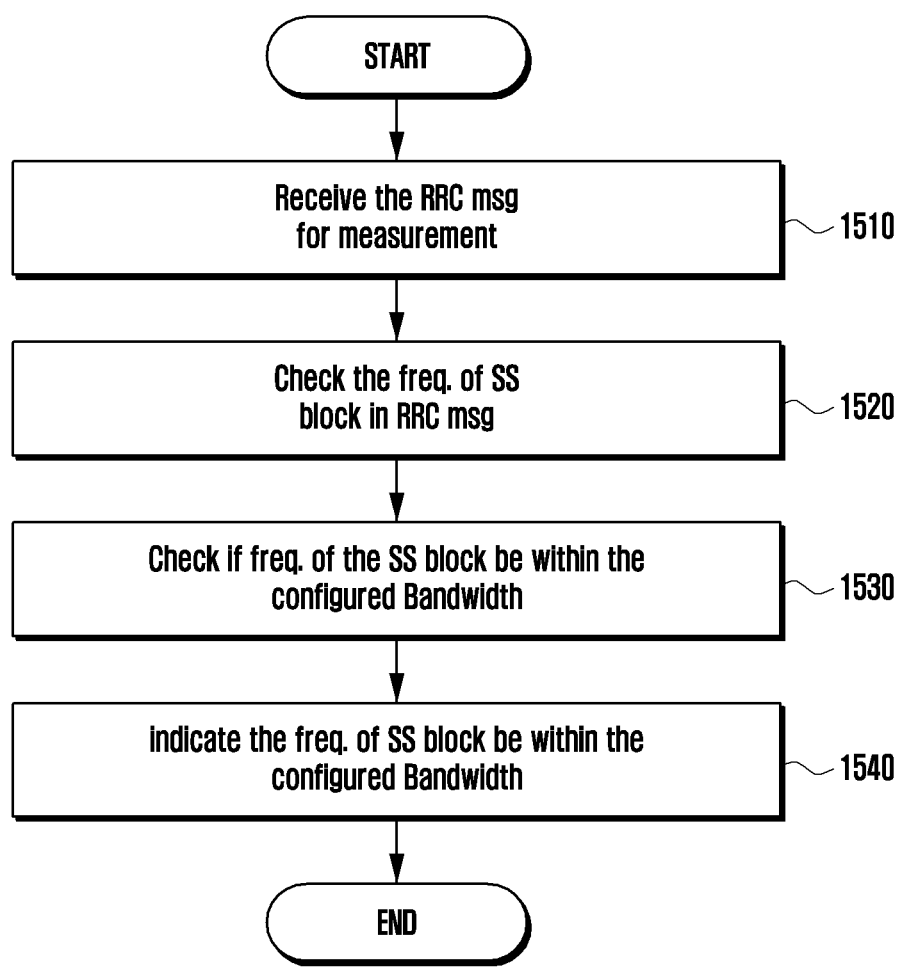

FIG. 13 to FIG. 15 illustrate an example of a method in which a UE stores SS/PBCH block information according to an embodiment of the disclosure.

Referring to FIG. 13, the UE may generate a database (DB) including information about an SS/PBCH block in operation 1310. That is, the UE may generate a database for storing information associated with a synchronization signal (SS, e.g., an SS/PBCH block) that is recognized in an initial access process. When there is a database already stored in the UE exists, this operation may be omitted.

In operation 1320, the UE may camp on a base station. In operation 1330, the UE may store information about a synchronization signal associated with a camped cell in the database. According to an embodiment, the UE may also store information about a PBCH together with the information about the synchronization signal in the database. The information about the synchronization signal associated with the camped cell may be information about a cell-defining SS/PBCH block. Further, according to an embodiment, the information about the synchronization signal associated with the camped cell may include information about all SS/PBCH blocks included in the operating frequency of the UE.

In operation 1340, the UE may receive an RRC message for RRC connection (operation 1341), and may store information about a synchronization signal when the information about the synchronization signal included in the RRC message is included in the operating frequency band (operation 1345).

Specifically, referring to FIG. 14, in operation 1410, the UE may receive an RRC message for RRC connection. In operation 1420, the UE may identify information about a synchronization signal included in the RRC message. For example, the UE may identify frequency information about the synchronization signal. In operation 1430, the UE may identify whether the frequency of the synchronization signal is included in the operating frequency band of the UE (or the operating frequency band of the base station). When the frequency of the synchronization signal is included in the operating frequency band of the UE, the UE may store frequency information about the synchronization signal in operation 1440.

Referring back to FIG. 13, in operation 1350, the UE may receive an RRC message for measurement (operation 1351), and may store information about a synchronization signal when the information about the synchronization signal included in the RRC message is included in the operating frequency band (operation 1355).

Specifically, referring to FIG. 15, in operation 1510, the UE may receive an RRC message for measurement. In operation 1520, the UE may identify information about a synchronization signal included in the RRC message. For example, the UE may identify frequency information about the synchronization signal. In operation 1530, the UE may identify whether the frequency of the synchronization signal is included in the operating frequency band of the UE (or the operating frequency band of the base station). When the frequency of the synchronization signal is included in the operating frequency band of the UE, the UE may store frequency information about the synchronization signal in operation 1540.

Figure 16:
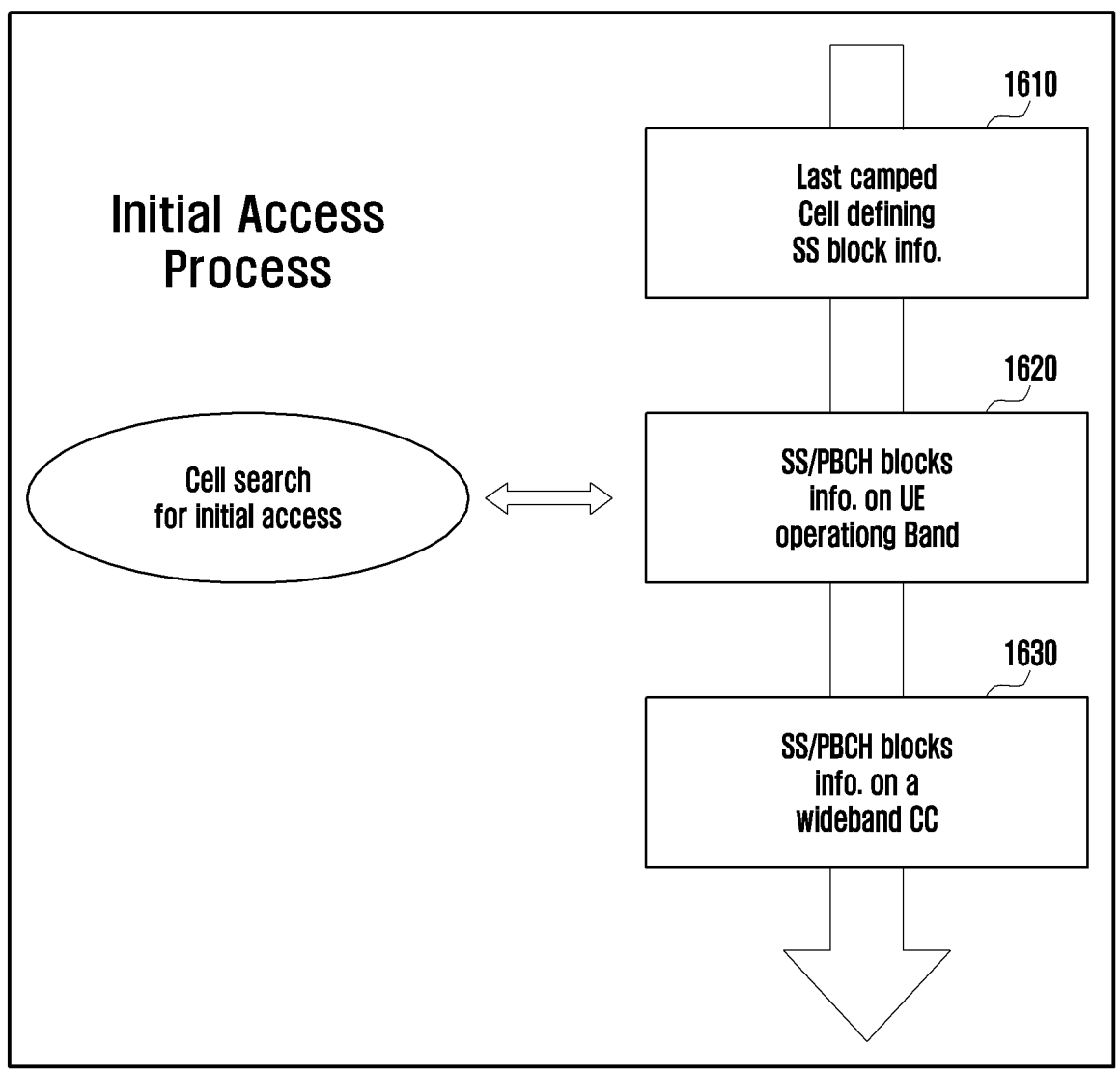
FIGS. 16, 17, and 18 illustrate an example of a method in which a terminal uses a database including information about an SS/PBCH block according to an embodiment of the disclosure.
Figure 17:
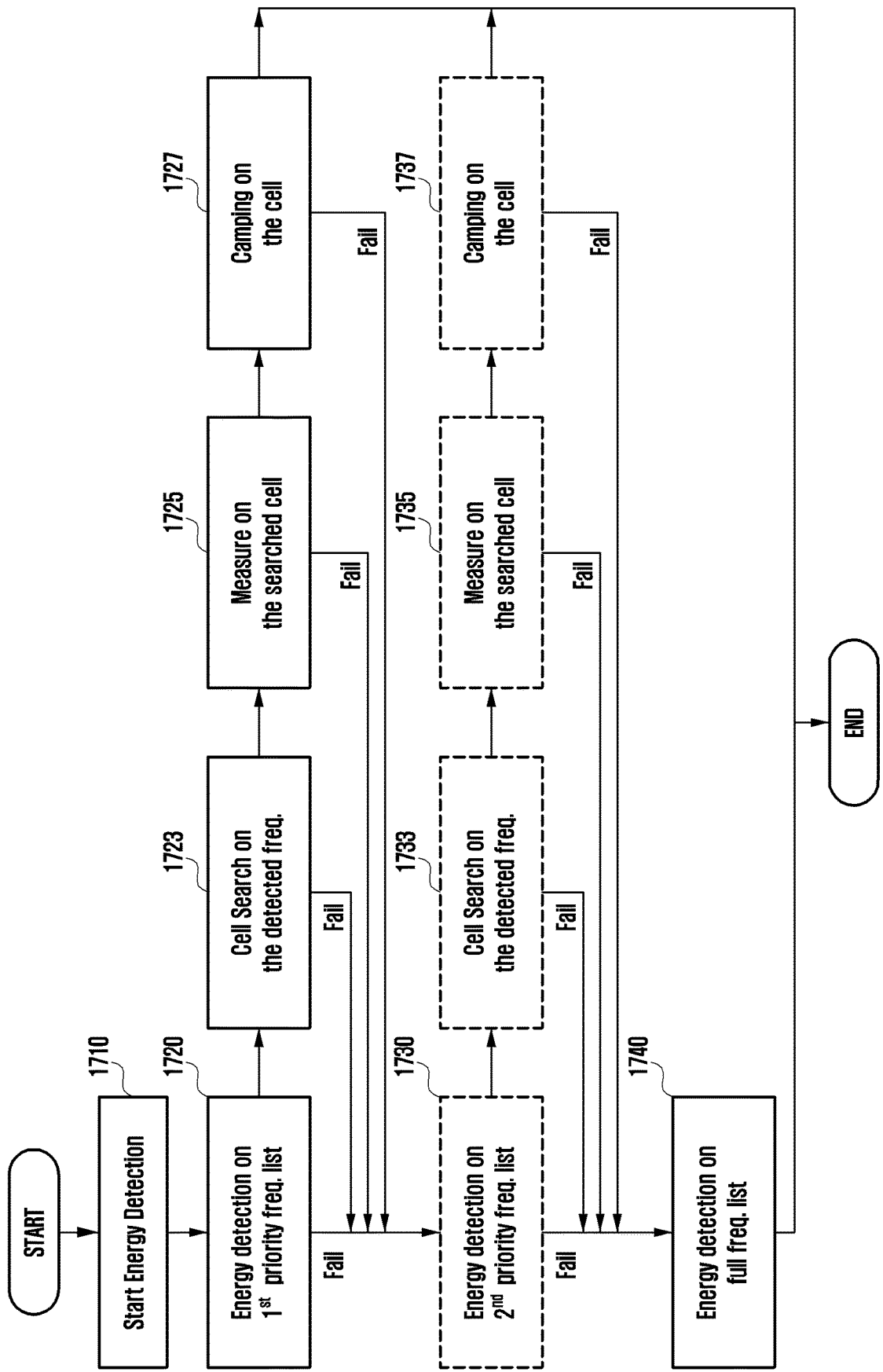
Figure 18:
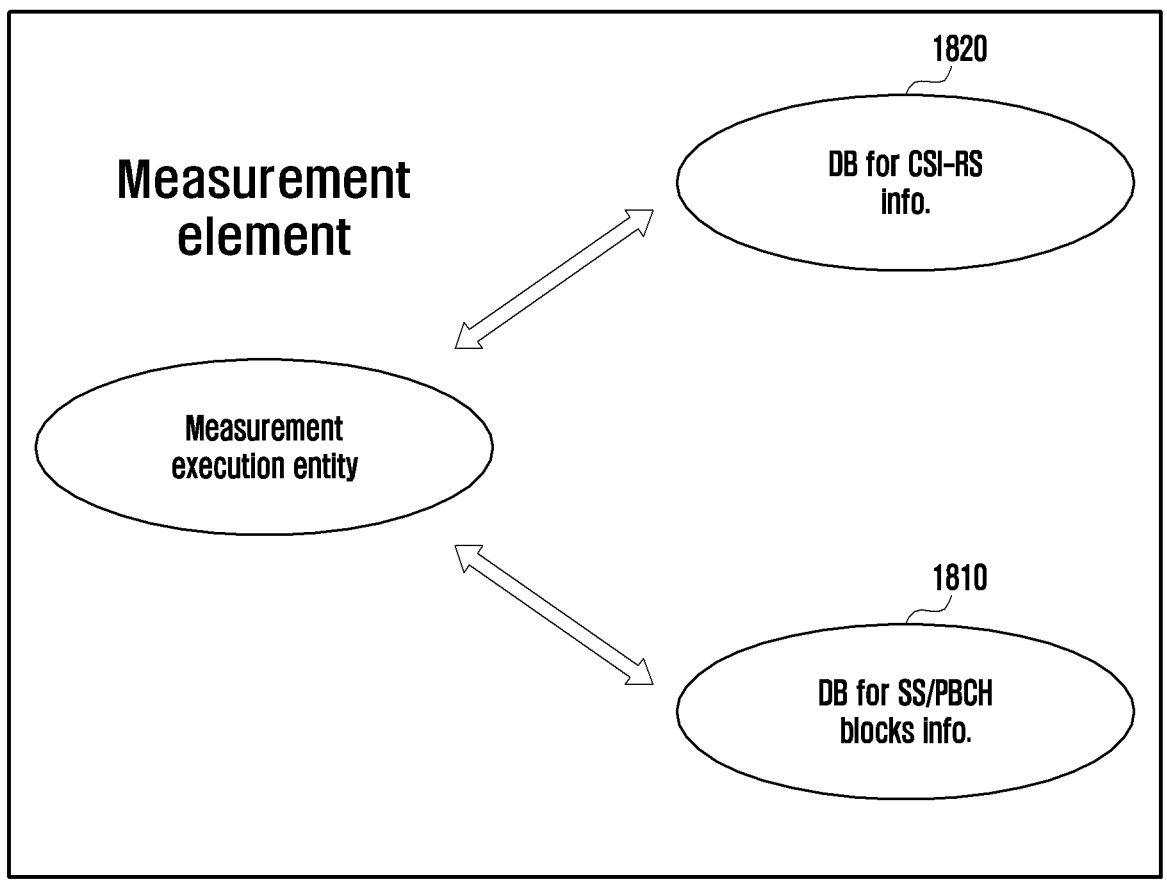

FIG. 16 to FIG. 18 illustrate an example of a method in which a UE uses a database including information about an SS/PBCH block according to an embodiment of the disclosure.

Referring to FIG. 16 to FIG. 18, the UE may use information about an SS/PBCH block stored in a DB according to the operation of the UE.

In one embodiment, referring to FIG. 16, the UE may utilize one or more of data stored in the DB in initial access.

When the UE is disconnected from a cell due to power-off, entering in an airplane mode or a power saving mode, or similar reasons and is then reconnected, the UE may obtain information stored in the DB according to priority and may use the information in an initial connection process. Here, information about a cell-defining SS/PBCH block of a cell on which the UE has just previously camped (last camped cell) may have the highest priority (1610). Information about an SS/PBCH block included in an operating frequency band of the UE in which the UE has just previously operated may have a lower priority (1620). Information about an SS/PBCH block included in a wideband CC including the operating frequency band of the UE in which the UE has just previously operated may have an even lower priority (1630). The UE may select at least one of the foregoing pieces of information and may perform an initial access procedure. In addition, according to an embodiment, the UE may attempt camping by performing an initial access procedure sequentially or simultaneously using at least one piece of information selected from among the foregoing pieces of information according to the priority. In another embodiment, the information 1610 about the cell-defining SS/PBCH block of the cell on which the UE has just previously camped and the information 1620 about the SS/PBCH block included in the operating frequency band of the UE in which the UE has just previously operated may have the same priority. In still another embodiment, the information 1610 about the cell-defining SS/PBCH block of the cell on which the UE has just previously camped and the information 1630 about the SS/PBCH block included in the wideband CC including the operating frequency band of the UE in which the UE has just previously operated may have the same priority.

Specifically, the UE may utilize at least one of the foregoing pieces of information stored in the DB for energy detection in the initial access procedure. However, since a frequency band supported by the base station is wide, it may take a long time for the UE to find the information per SS block. Therefore, the UE attempts a cell search using at least one of the foregoing pieces of information stored in the DB according to the priority defined above, and may perform a full search using an SS block search unit (synchronization rater) for each of a below 6 band, a band shared with LTE of the below 6 band, and an above 6 band defined by the 3GPP.

Referring to FIG. 17, in operation 1710, the UE may start energy detection for initial access.

In operation 1720, the UE may first perform energy detection in a list of a frequency band having a first priority. For example, the frequency band having the first priority may include information about a cell-defining SS/PBCH block of a cell on which the UE has just previously camped (last camped cell). Alternatively, the frequency band having the first priority may include information about an SS/PBCH block included in an operating frequency band of the UE in which the UE has just previously operated.

In operation 1723, the UE may perform a cell search in the detected frequency band. The UE may perform measurement on a detected cell in operation 1725 and may camp on the detected cell in operation 1727.

When the UE fails in energy detection in the list of the frequency band having the first priority in operation 1720, the UE may perform energy detection in a list of a frequency band having a second priority in operation 1730. For example, the frequency band having the second priority may include the information about the SS/PBCH block included in the operating frequency band of the UE in which the UE has just previously operated. Alternatively, the frequency band having the second priority may include information about an SS/PBCH block included in a wideband CC including the operating frequency band of the UE in which the UE has just previously operated. Even when the UE fails the cell search in operation 1723, fails the measurement in operation 1725, or fails to camp the detected cell in operation 1727, the UE may perform energy detection in the list of the frequency band having the second priority in operation 1730.

In operation 1733, the UE may perform a cell search in the detected frequency band. The UE may perform measurement on a detected cell in operation 1735 and may camp on the detected cell in operation 1737.

When the UE fails in energy detection in the list of the frequency band having the second priority in operation 1730, the UE may perform energy detection in a list of all frequency bands in operation 1740. That is, the UE may perform a full search using an SS block search unit (synchronization rater) for each of a below 6 band, a band shared with LTE of the below 6 band, and an above 6 band defined by the 3GPP. Even when the UE fails the cell search in operation 1733, fails the measurement in operation 1735, or fails to camp the detected cell in operation 1737, the UE may perform energy detection in the list of all frequency bands in operation 1740. Further, although not shown, the UE may perform energy detection in all frequency bands, may select a cell based on the result, and may camp on the cell.

Next, referring to FIG. 18, the UE may use SS/PBCH block information 1810 stored in a DB for cell quality measurement. First, the UE may measure the quality of a serving cell using information about an SS/PBCH block currently marked as a cell-defining SS/PBHCH block. The UE may identify 'time location information about an SS block to be measured by the UE that is indicated by a network' stored in the DB and may use the time location information to measure cell quality.

According to an embodiment, the UE may generate a DB for CSI-RS information 1820 that the UE needs to measure, such as SS/PBCH block information, and may store the same in the DB.

Figure 19:
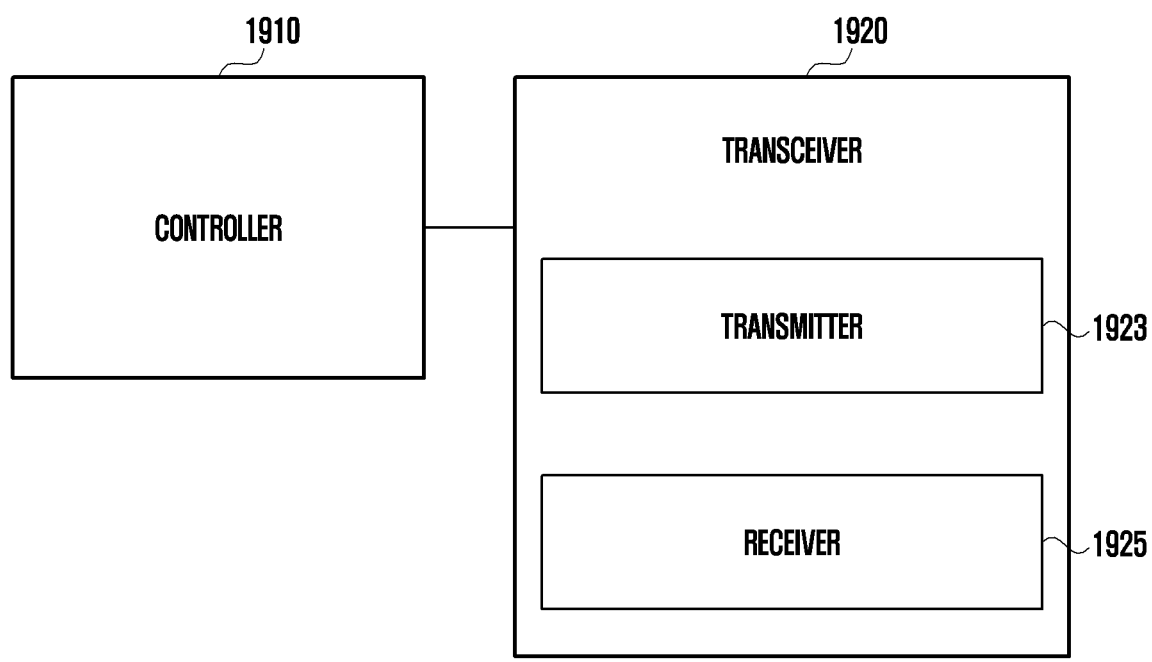
FIG. 19 illustrates the configuration of a terminal according to the disclosure.

FIG. 19 is a block diagram illustrating the configuration of a UE according to an embodiment of the disclosure.

Referring to FIG. 19, the UE according to an embodiment of the disclosure may include a transceiver 1920 and a controller 1910 to control the overall operation of the UE. The transceiver 1920 may include a transmitter 1923 and a receiver 1925.

The controller 1910 of the UE controls the UE to perform an operation according to any one of the foregoing embodiments. For example, the controller 1910 of the UE may detect at least one synchronization signal in an operating frequency band of the UE, may detect a cell based on a first synchronization signal among the at least one detected synchronization signal, may camp on the detected cell, and may store information about the at least one detected synchronization signal. Further, the controller 1910 may determine whether there is previously stored information about a synchronization signal, and may detect the at least one synchronization signal based on the previously stored information about the synchronization signal when there is the previously stored information about the synchronization signal. In addition, the controller 1910 may store information about the first synchronization signal in association with a first priority and may store information about a synchronization signal other than the first synchronization signal in association with a second priority. The controller 1910 may select the first synchronization signal having the highest signal strength among the at least one detected synchronization signal. Furthermore, the controller 1910 may receive information about at least one synchronization signal included in an operating frequency band of a base station from the base station, may store the information about the at least one synchronization signal included in the operating frequency band of the base station, and may detect the at least one synchronization signal included in the operating frequency band of the UE based on the information about the at least one synchronization signal included in the operating frequency band of the base station.

The transceiver 1920 of the UE may transmit and receive a signal according to an operation according to any one of the foregoing embodiments.

The controller 1910 and the transceiver 1920 are not necessarily configured as separate modules but may be configured as a single component, such as a single chip. The controller 1910 and the transceiver 1920 may be electrically connected.

The controller 1910 may be, for example, a circuit, an application-specific circuit, or at least one processor. Operations of the UE may be implemented by including a memory device (storage unit) that stores a corresponding program code in any component in the UE. That is, the controller 1910 may execute the foregoing operations by a processor or a central processing unit (CPU) reading and executing the program code stored in the memory device.

Figure 20:
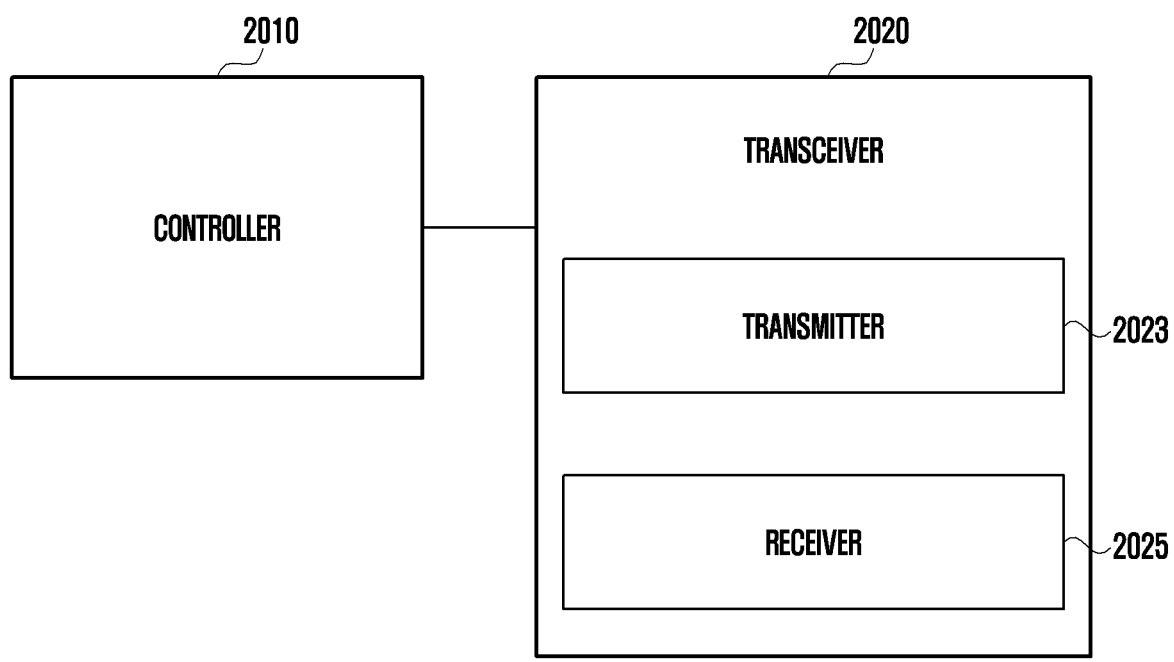
FIG. 20 illustrates the configuration of a base station according to the disclosure.

FIG. 20 is a block diagram illustrating the configuration of a base station according to an embodiment of the disclosure.

Referring to FIG. 20, the base station according to an embodiment of the disclosure may include a transceiver 2020 and a controller 2010 to control the overall operation of the base station. The transceiver 1920 may include a transmitter 2023 and a receiver 2025.

The controller 2010 of the base station controls the base station to perform an operation according to any one of the foregoing embodiments. For example, the controller 2010 of the base station may transmit a synchronization signal to a UE. The controller 2010 may notify the UE of information about an SS/PBCH block.

The transceiver 2020 of the base station may transmit and receive a signal according to an operation according to any one of the foregoing embodiments.

The controller 2010 and the transceiver 2020 are not necessarily configured as separate modules but may be configured as a single component, such as a single chip. The controller 2010 and the transceiver 2020 may be electrically connected.

The controller 2010 may be, for example, a circuit, an application-specific circuit, or at least one processor. Operations of the base station may be implemented by including a memory device (storage unit) that stores a corresponding program code in any component in the UE. That is, the controller 2010 may execute the foregoing operations by a processor or a central processing unit (CPU) reading and executing the program code stored in the memory device.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary.

The invention claimed is:

1. A communication method of a terminal in a wireless communication system, the method comprising:
   detecting at least one synchronization signal;
   identifying whether the at least one detected synchronization signal is included in an operating frequency band of the terminal; and
   storing information about the at least one synchronization signal identified to be included in the operating frequency band of the terminal.

2. The method of claim 1, wherein the information about the at least one synchronization signal comprises at least one of frequency information and time information about the at least one synchronization signal.

3. The method of claim 1, further comprising:
   detecting a cell, based on a first synchronization signal among the at least one detected synchronization signal; and
   camping on the detected cell.

4. The method of claim 1, wherein the storing of the information about the at least one synchronization signal comprises:
   storing a first synchronization signal associated with a cell on which the terminal camps and a second synchronization signal included in the operating frequency band of the terminal.

5. The method of claim 1, wherein the detecting of the at least one synchronization signal comprises:
   determining whether there is previously stored information about a synchronization signal; and
   detecting the at least one synchronization signal, based on the previously stored information about the synchronization signal, when there is the previously stored information about the synchronization signal.

6. The method of claim 1, wherein the detecting of the at least one synchronization signal comprises:
   receiving information about at least one synchronization signal included in an operating frequency band of a base station from the base station;
   storing the information about the at least one synchronization signal included in the operating frequency band of the base station; and
   detecting the at least one synchronization signal included in the operating frequency band of the terminal, based on the information about the at least one synchronization signal included in the operating frequency band of the base station.

7. The method of claim 1, wherein the at least one detected synchronization signal comprises at least one of a synchronization signal of a cell on which the terminal camps, a synchronization signal included in a radio resource control (RRC) message for measurement, and a synchronization signal detected in an initial access procedure of the terminal.

8. A terminal comprising:
   a transceiver configured to transmit and receive a signal; and
   a controller configured to:
   detect at least one synchronization signal,
   identify whether the at least one detected synchronization signal is included in an operating frequency band of the terminal, and
   store information about the at least one synchronization signal identified to be included in the operating frequency band of the terminal.

9. The terminal of claim 8, wherein the information about the at least one synchronization signal comprises at least one of frequency information and time information about the at least one synchronization signal.

10. The terminal of claim 8, wherein the controller is configured to:
    detect a cell, based on a first synchronization signal among the at least one detected synchronization signal, and
    camp on the detected cell.

11. The terminal of claim 8, wherein the controller is configured to:
    store a first synchronization signal associated with a cell on which the terminal camps and a second synchronization signal included in the operating frequency band of the terminal.

12. The terminal of claim 8, wherein the controller is configured to:
    determine whether there is previously stored information about a synchronization signal, and
    detect the at least one synchronization signal, based on the previously stored information about the synchronization signal when there is the previously stored information about the synchronization signal.

13. The terminal of claim 8, wherein the controller is configured to:
    receive information about at least one synchronization signal included in an operating frequency band of a base station from the base station,
    store the information about the at least one synchronization signal included in the operating frequency band of the base station, and
    detect the at least one synchronization signal included in the operating frequency band of the terminal, based on the information about the at least one synchronization signal included in the operating frequency band of the base station.

14. The terminal of claim 8, wherein the at least one detected synchronization signal comprises at least one of a synchronization signal of a cell on which the terminal camps, a synchronization signal included in a radio resource control (RRC) message for measurement, and a synchronization signal detected in an initial access procedure of the terminal.

* * * * *